United States Patent [19]

Oskouy et al.

[11] Patent Number: 6,026,443

[45] Date of Patent: Feb. 15, 2000

[54] MULTI-VIRTUAL DMA CHANNELS, MULTI-BANDWIDTH GROUPS, HOST BASED CELLIFICATION AND REASSEMBLY, AND ASYNCHRONOUS TRANSFER MODE NETWORK INTERFACE

[75] Inventors: Rasoul M. Oskouy, Fremont; Tom Lyon, Palo Alto; Prakash Kashyap, Fremont, all of Calif.

[73] Assignee: Sun Microsystems, Inc., Mountain View, Calif.

[21] Appl. No.: 07/995,591

[22] Filed: Dec. 22, 1992

[51] Int. Cl.[7] ........................................................ G06F 13/00
[52] U.S. Cl. .................................................................. 709/230
[58] Field of Search ........................................ 395/800, 200,
395/275, 250, 400, 200.07, 842; 364/DIG. 1;
370/60, 94.1, 60.1; 709/230

[56] References Cited

U.S. PATENT DOCUMENTS

| | | | |
|---|---|---|---|
| 4,901,234 | 2/1990 | Heath et al. | 364/DIG. 1 |
| 5,136,584 | 8/1992 | Hedlund | 370/94.1 |
| 5,179,556 | 1/1993 | Turner | 370/94.1 |
| 5,274,768 | 12/1993 | Traw et al. | 395/275 |
| 5,280,475 | 1/1994 | Yanagi et al. | 370/60 |
| 5,282,207 | 1/1994 | Jurkevich et al. | 370/110.1 |
| 5,287,347 | 2/1994 | Spanke | 370/60 |
| 5,301,287 | 4/1994 | Herrell et al. | 395/400 |
| 5,303,302 | 4/1994 | Burrows | 380/49 |
| 5,313,453 | 5/1994 | Uchida et al. | 370/13 |
| 5,329,623 | 7/1994 | Smith et al. | 395/275 |
| 5,347,634 | 9/1994 | Herrell et al. | 395/250 |
| 5,365,519 | 11/1994 | Kozaki et al. | 370/60 |
| 5,379,297 | 1/1995 | Glover et al. | 370/60.1 |
| 5,404,522 | 4/1995 | Carmon et al. | 395/650 |
| 5,444,853 | 8/1995 | Lentz | 395/250 |

*Primary Examiner*—John A. Follansbee
*Attorney, Agent, or Firm*—Blakely Sokoloff Taylor & Zafman

[57] ABSTRACT

A control memory is provided for storing the control and state information of a number of virtual direct memory access (DMA) channels. A control memory arbiter and a control memory data bus are also provided to arbitrate accesses to the control memory to facilitate asynchronous transmit and receive. Separate areas in the control memory are provided for storing the control and state information of the transmit DMAs, and the receive DMAs. Additionally, descriptive information about the transmit/receive data ring and its descriptor, the data packet being transferred and its cells are also stored for the transmit and receive DMAs. The control memory is also used to stored a programmable bandwidth group (BWG) table comprising a plurality of BWG index entries for bandwidth selection. A Segmentation And Reassembly (SAR) module which cellifies transmit packets and reassembly receive packets on the host computer is also provided for segmenting transmit packets into transmit cells for transmission, and reassembling receive cells into receive packets. Two series of FIFOs are provided for staging the transmit and receive cell payloads. Lastly, complement to the SAR module, a media cell manager (MCM) module is provided for packing the transmit cell payloads before their transmission, and unpacking the receive cell payloads upon their receipt. The cyclic redundancy check (CRC) value for each transmit packet is calculated incrementally. Transmit tags are used to differentiate the transmit cell payloads from the packet header and packing instructions; and receive tags are used to differentiate the receive cell payloads from the packet header and the end of packet marker.

32 Claims, 23 Drawing Sheets

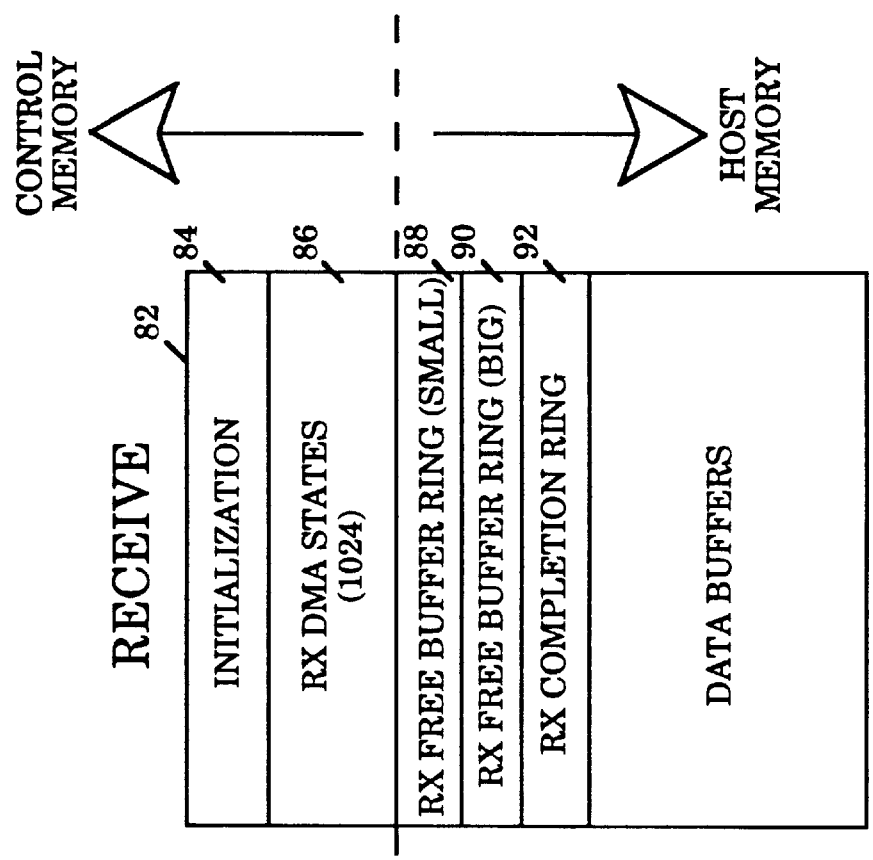
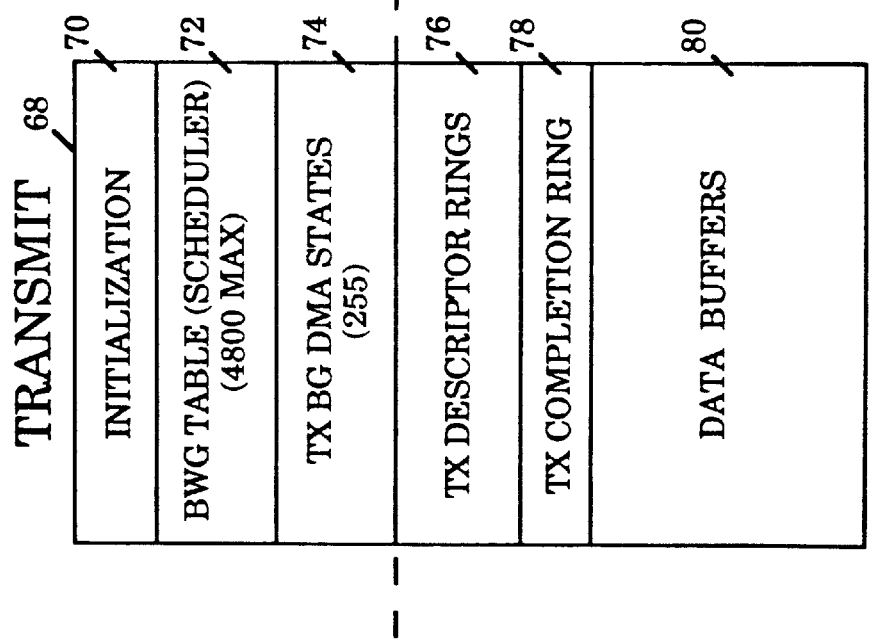
*Figure 3*

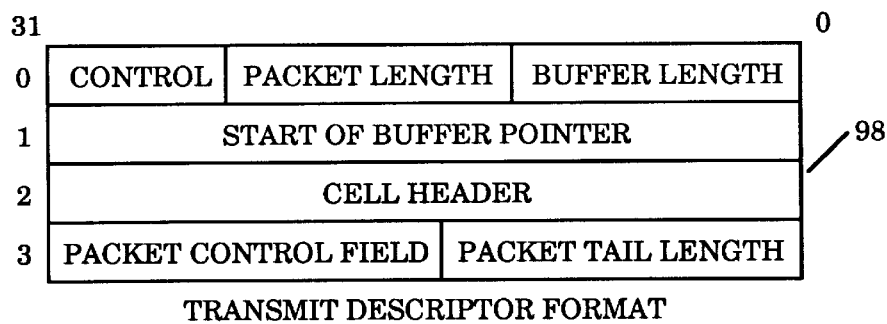
TRANSMIT DESCRIPTOR FORMAT
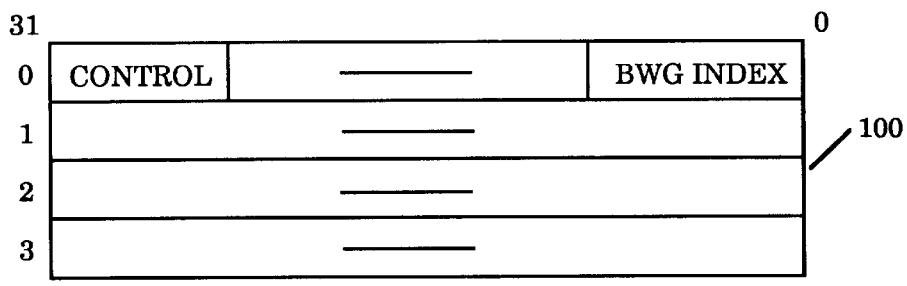
TRANSMIT COMPLETION DESCRIPTOR FORMAT
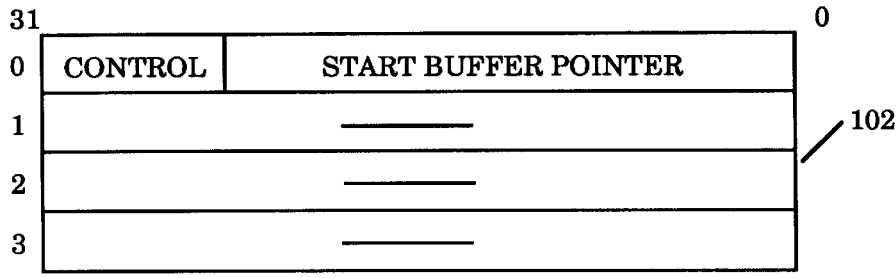
RECEIVE FREE BUFFER DESCRIPTOR FORMAT
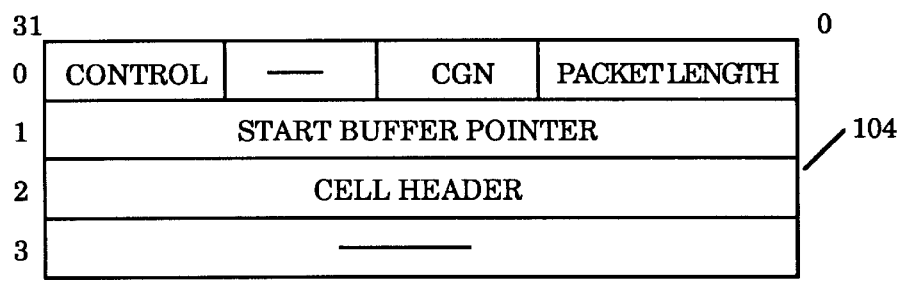
RECEIVE COMPLETION DESCRIPTOR FORMAT
*Figure 5*

| 31 | | | 0 |
|---|---|---|---|
| 0 | CONTROL | CURRENT PACKET LENGTH | CURRENT BUFFER LENGTH |
| 1 | CURRENT BUFFER PONTER ||||
| 2 | CELL HEADER ||||
| 3 | BWG ON/OFF ||||
| 4 | TRANSMIT DATA RING BASE POINTER || TRANSMIT DESCRIPTOR RING OFFSET POINTER ||
| 5 | — || TRANSMIT CELL COUNTER ||
| 6 | PARTIAL PACKET CRC ||||
| 7 | TAIL CONTROL || TAIL LENGTH ||

106

TX DMA STATE

| 31 | | | 0 |
|---|---|---|---|
| 0 | CONTROL | CGN | CURRENT END OF PACKET/ BUFFER LENGTH |
| 1 | CURRENT BUFFER PONTER ||||
| 2 | START OF BUFFER POINTER ||||
| 3 | CONTROL || END OF PACKET LENGTH/ BUFFER LENGTH ||
| 4 | END OF PACKET MASK ||||
| 5 | PARTIAL PACKET CRC ||||
| 6 | — ||||
| 7 | — ||||

108

RX DMA STATE

*Figure 6*

● TRANSMIT (tx_fifo_tag)

| | | |
|---|---|---|
| 62 → | VALID TAGS<br><br>1 = VALID BYTE<br><br>0 = INVALID BYTE | 0001<br>0010<br>0011<br>0100<br>0110<br>0111<br>1000<br>1100<br>1110<br>1111 |
| 64 → INVALID TAGS | START PADDING & INCLUDE CRC | 0000 |
| | START PADDING W/O CRC | 0101 |
| | GENERATE IDLE CELL | 1001 |
| | BEG OF PACKET (HEADER) INITIALIZE CRC TO 0 | 1011 |
| | | |

60

● RECEIVE (rx_fifo_tag)

| | | |
|---|---|---|
| PAYLOAD ENTRY | | 0000 |
| HEADER ENTRY | | 0001 |
| LAST WORD OF PACKET | NO CRC ERROR | 0010 |
| | W/CRC ERROR | 0011 |
| LAST WORD OF PAYLOAD | | 0100 |

MULTI-VIRTUAL DMA CHANNELS, MULTI-BANDWIDTH GROUPS, HOST BASED CELLIFICATION AND REASSEMBLY, AND ASYNCHRONOUS TRANSFER MODE NETWORK INTERFACE

BACKGROUND OF THE INVENTION

1. Field of the Invention

The present invention relates to the field of computer networks, in particular, the network interfaces of the networked computer systems. More specifically, the present invention relates to high performance cell based network interfaces and the underlying technology for implementing these high performance network interfaces.

2. Art Background

Traditionally, in a computer system network, computer systems are physically connected to each other via media connected to the network interfaces of the computer systems. Various approaches have been developed in the art to transfer data between the computer systems. Typically, each network interface comprises a small number of DMA channels, each having a predetermined bandwidth, for transferring data. The network services of the operating systems running on these computer systems handle the physical transfer of data between the computer systems in the pre-determined bandwidth rates in accordance to pre-established protocols. The applications running on the computer systems are shielded from the physical details. The applications manage the transfer data at the data structure level.

For a large computer system network, it is often desirable to connect the computer systems to each other via switches. The switches may include public and local switches. A computer system is connected to a local switch via its network interface and a medium. The local switch is in turn directly or indirectly coupled to a public switch. The public switches are coupled to each other. For such large computer system networks, it is further desirable for the switches to be able to transfer data between the computer systems asynchronously. Thus, a number of cell based asynchronous transfer approaches for transferring data between computer systems in a large computer system network have emerged in the art. However, due to the small number of DMA channels, the traditional network interface severely limits the performance gain of these cell based asynchronous transfer approaches.

Traditional DMA channels are typically register based. Each additional channel typically requires a complete replication of the register set and related resources. Thus, it is costly, particularly in terms of hardware real estate, to increase the number of these register based DMA channels in a network interface. It is virtually impractical to have hundreds of register based DMA channels. Therefore, it is desirable if a large number of DMA channels can be provided for these cell based asynchronous transfer approaches in a less costly manner.

Additionally, it is not uncommon for many applications running on these computer systems, such as multimedia applications, wanting to use different bandwidths for transferring data among applications. Therefore, it is further desirable for these network interfaces to support multiple selectable bandwidth groups for these cell based asynchronous transfer approaches.

Traditional cell based asynchronous transfer approaches typically cellify and reassemble the transfer data packet at the network interface level. Cellification and reassembly of the transfer data packet at the network interface level has at least three disadvantages. One, it imposes greater storage requirement on the network interface. Two, transmission of the transfer data cannot start until the entire data packet has been segmented. Three, the received data are not available until the entire data packet has been reassembled. Thus, it is further desirable if the transfer data can be transmitted and made available as the transfer data packet is being segmented and reassembled.

Additionally, for data integrity, most cell based asynchronous transfer approaches include some form of cyclic redundancy check (CRC). Typically, the CRC calculations are performed at the packet level. Thus, it is further desirable if transfer data can be transmitted and made available as the transfer data packet is being segmented and reassembled, data integrity check that is equivalent to the traditional CRC can still be provided.

As will be disclosed, the present invention provides an asynchronous transfer mode network interface that achieves the desired results described above, using memory based DMA channels, bandwidth group table, host based cellification and reassembly of data packets, partial CRC calculations, and cell tags.

SUMMARY OF THE INVENTION

Memory based virtual DMA channels, dynamic bandwidth selection, host-based cellification and reassembly of transmit and receive data packets, partial cyclic redundancy check (CRC) calculations, cell tags and their applications to an asynchronous transfer mode (ATM) network interface are disclosed. The ATM network interface has particular application to large computer system networks for connecting a computer system to an ATM switch.

Under the present invention, a control memory is provided for storing the control and state information of a number of virtual direct memory access (DMA) channels. The control and state information for the various DMA channels are accessed and updated by common resources, thereby allowing a large number of virtual DMA channels to be provided. Beside the standard DMA control and state information, application specific information regarding the data being transferred are also stored for each virtual DMA channel.

For the ATM network interface of the present invention, a control memory arbiter and a control memory data bus are also provided to arbitrate accesses to the control memory to facilitate asynchronous transmit and receive. Additionally, separate areas in the control memory are provided for storing the control and state information of the transmit DMAs, and the receive DMAs. Beside the standard DMA control and state information, such as address and count, the control and state information stored for a transmit/receive DMA state further comprises various information about the transmit/receive data ring and its descriptor, the data packet being transferred and its cells.

Under the present invention, the control memory is also used to store a programmable bandwidth group (BWG) table for bandwidth selection, among other uses. The BWG table comprises a number of BWG index entries pointing to the various transmit DMA states. The transmit DMA states, through their stored transmit data ring information, in turn point to the various transmit data rings having corresponding pre-assigned bandwidth rates. Thus, by selecting a transmit data ring having a particular pre-assigned bandwidth rate, an application may select a bandwidth rate for a particular transmission.

Under the present invention, a Segmentation And Reassembly (SAR) module which cellifies transmit packets and reassemble receive packets on the host computer is also provided for segmenting transmit packets into transmit cells for transmission, and reassembling receive cells into receive packets. At least one series of FIFOs is provided for staging the transmit and receive cell payloads.

At each transmit cell time opportunity, the SAR module retrieves a BWG index in the BWG table in a predetermined manner, and services the transmit packet of a transmit DMA indexed by the retrieved BWG index. The SAR module retrieves the control and state information of the indexed transmit DMA from the control memory, and services the transmit packet of indexed transmit DMA accordingly. Depending on the state of the indexed transmit DMA and the fullness of the staging FIFOs, the SAR module conditionally causes sufficient data for a transmit cell payload to be burst from the indexed transmit data ring on the host computer to the staging FIFOs. The SAR module pushes the retrieved BWG index, a transmit cell header, and the transmit cell payload into the staging FIFOs. The SAR module also updates its transmit cell counter, and the transmit DMA state of the serviced transmit DMA in the control memory.

Similarly, at every receive cell time opportunity, depending on the fullness of the staging FIFOs, the SAR module pops the receive cell header and the receive cell payload of a receive cell from the staging FIFOs. The SAR module extracts the virtual channel identifier (VCI) from the receive cell header, and retrieves the control and state information of the corresponding receive DMA in the control memory. The SAR module causes the receive cell payload to be bursted and transferred to the indexed receive data buffer on the host computer. The SAR module also updates the receive DMA state of the serviced receive DMA in the control memory.

For the ATM network interface of the present invention, two separate series of staging FIFOs are provided for staging the transmit and receive cell payloads. The cellification and reassembly logic of the SAR module are segregated to facilitate asynchronous cellification of the transmit packets including pushing of the transmit cell payloads into the transmit FIFOs, and reassembly of the receive packets including popping of the receive cell payloads from the receive FIFOs, at every cell time opportunity.

Complement to the SAR module, a media cell manager (MCM) module is provided for packing the transmit cell payloads before their transmission, and unpacking the receive cell payloads upon their receipt.

At every transmit cell time opportunity, depending on the state of the staging FIFOs as indicated by the transmit cell counter of the SAR module, the MCM module pops the BWG index, the transmit cell header, and the transmit cell payload of a transmit cell, and packages them for transmission. The MCM module retrieves the control and state information for the corresponding transmit DMA from the control memory, and packages the transmit cell payload accordingly. The MCM module also updates the transmit DMA state of the serviced transmit DMA in the control memory.

Similarly, upon receiving every receive cell, depending on the fullness of the staging FIFOs, the MCM module also conditionally services a receive cell received by the media interface. The MCM module extracts the VCI from the receive cell header of the receive cell, and retrieves the control and state information of the corresponding receive DMA in the control memory. The MCM module unpacks the receive cell payload of the receive cell, and pushes the receive cell header and the receive cell payload into the receive FIFOs. The MCM module also updates the receive DMA state of the serviced receive DMA in the control memory.

For the ATM network interface of the present invention, the transmit packing and receive unpacking logic of the SAR module are also segregated to facilitate asynchronous packing of the transmit cell payloads including popping of the transmit cell payloads from the transmit FIFOs, and unpacking of the receive cell payloads including pushing of the receive cell payloads into the receive FIFOs, at every cell time opportunity.

Under the present invention, the cyclic redundancy check (CRC) value for each transmit packet is calculated incrementally. A partial CRC value is maintained for each transmit DMA, as part of the control and state information stored in the control memory. The partial CRC value is retrieved from the control memory by the MCM module each time it packages a transmit cell payload. The MCM module regenerates a new partial CRC value based on the retrieved CRC value, and updates the stored CRC value with the newly generated CRC value.

Lastly, under the present invention, transmit tags are used to differentiate the transmit cell payloads from the packet header and packing instructions, such as padding the transmit cell payload with or without inclusion of the CRC value; and receive tags are used to differentiate the receive cell payloads from the packet header and the end of packet marker. The SAR module pushes the BWG index, the packet header, and the transmit cell payload into the staging FIFOs with the appropriate transmit tags. Similarly, the MCM module pushes the packet header, the receive cell payload, and the end of packet marker into the staging FIFOs with the appropriate receive tags.

In one embodiment, each transmit tag identifying a transmit cell payload also identifies the valid bytes of the multi-byte transmit cell payload, thereby requiring no boundary alignment restriction for the start of the transmit data buffer.

BRIEF DESCRIPTION OF THE DRAWINGS

The objects, features, and advantages of the present invention will be apparent from the following detailed description of the preferred and alternate embodiments of the invention with references to the drawings in which:

FIG. 3 illustrates the memory architecture of the network interface of the present invention, showing control memory and host memory usage for transmit and receive.

FIGS. 4–5 illustrate the interrelationship between the contents of the various memory blocks.

FIGS. 6–8 illustrate one embodiment of the bandwidth group (BWG) table, the transmit descriptor format, the transmit completion descriptor format, the receive free buffer descriptor format, the receive completion descriptor format, and the transmit and the receive direct memory access (DMA) states.

FIG. 11 illustrates one embodiment of the transmit and the receive FIFO tags.

DETAILED DESCRIPTION PRESENTLY PREFERRED AND ALTERNATE EMBODIMENTS

Memory based virtual DMA channels, dynamic bandwidth selection, host-based cellification and reassembly of transmit and receive data packets, partial cyclic redundancy check (CRC) calculations, cell tags and their application to an asynchronous transfer mode (ATM) network interface are disclosed. The ATM network interface has particular application to large computer system networks for connecting a computer system to a local asynchronous transfer mode switch.

For ease of understanding, the memory based virtual DMA channels, dynamic bandwidth selection, host-based cellification and reassembly of transmit and receive data packets, partial CRC calculations, and cell tags are described in the context of their applications to the ATM network interface of the present invention. However, it will be appreciated that these aspects of the present invention may be practiced in other non-ATM cell based network interfaces. Furthermore, the memory based virtual DMA channels and dynamic bandwidth selection may be practiced in other non-network interface input/output (I/O) applications.

Additionally, in the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
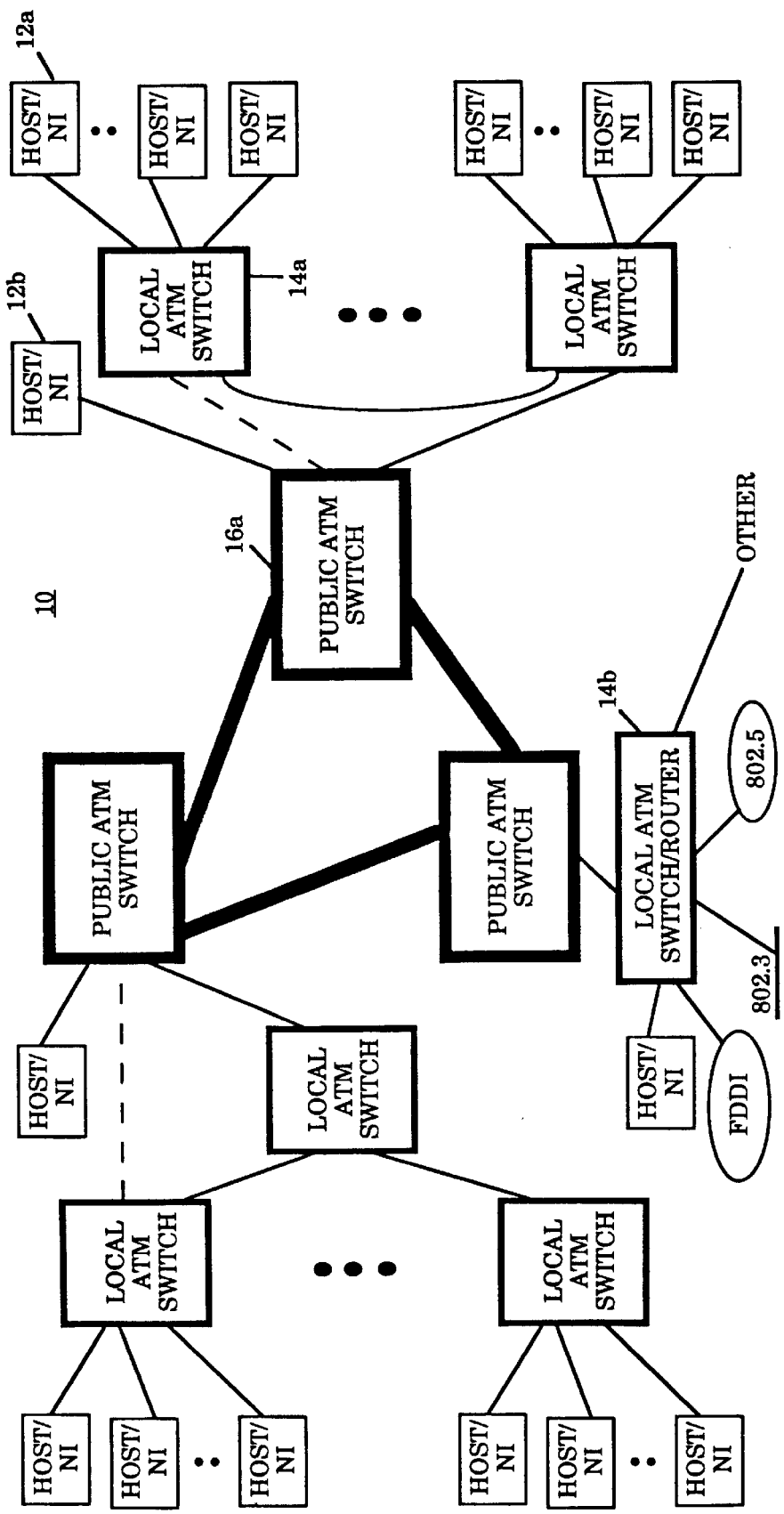
FIG. 1 shows an exemplary large computer system network incorporating the asynchronous transfer mode network interface of the present invention.

Referring now to FIG. 1, a block diagram illustrating an exemplary large computer system network incorporating the asynchronous transfer mode network interface of the present invention is shown. Shown are a number of computer systems incorporated with the network interface of the present invention, e.g. 12a, and 12b, coupled to a number of local asynchronous transfer mode (ATM) switches, e.g. 14a, and a number of public ATM switches, e.g. 16a. The local ATM switches, e.g. 12a, are in turn coupled to the public ATM switches, e.g. 16a. Data are transferred between applications running on these computer systems, e.g. 12a and 12b, asynchronously through the ATM switches, e.g. 4a and 16a. Additionally, beside computer systems incorporated with the network interface of the present invention, a local ATM switch, e.g. 14b, may also serve as a switch or router for other protocols.

Figure 2:
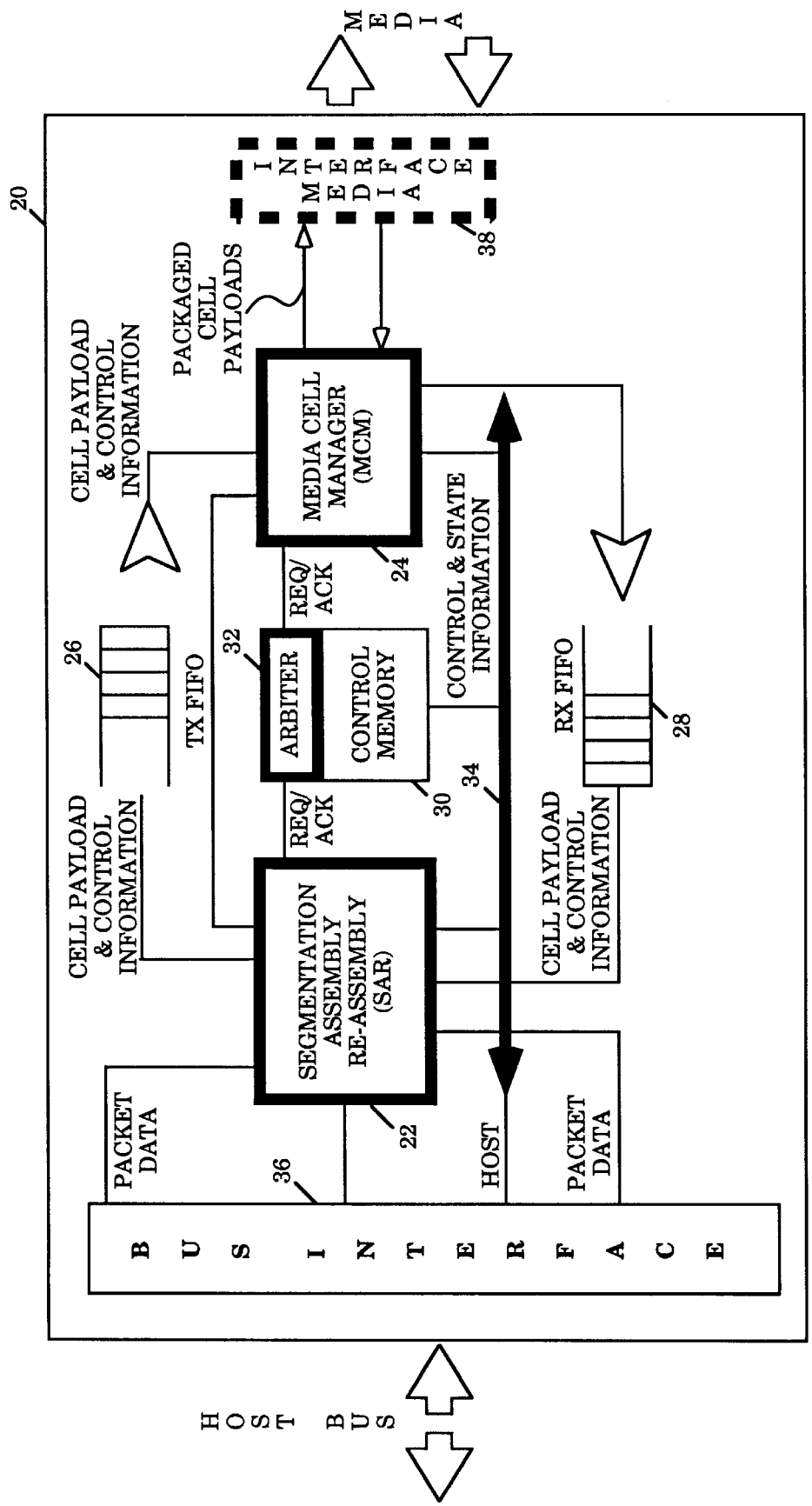
FIG. 2 illustrates the architecture of the network interface of the present invention, showing the control memory, its arbiter and data bus, the Segmentation and Reassembly (SAR) module, the media cell manager (MCM) module, the transmit and receive FIFOs, the bus and media interfaces.

Referring now to FIG. 2, a block diagram illustrating the architecture of the asynchronous transfer mode network interface of the present invention is shown. Shown is a control memory 30 coupled to its arbiter 32 and data bus 34. Additionally, a Segmentation And Reassembly (SAR) module 22, and a media cell manager (MCM) module 24, are shown coupled to each other, the control memory arbiter 32 and data bus 34, an array of transmit (TX) FIFOs 26, and an array of receive (RX) FIFOs 28. Furthermore, a system bus interface 36 and a media interface 38 are shown coupled to the SAR module 22 and the MCM module 24 respectively. The system bus interface 36 is in turn coupled to the system bus of the host computer, i.e. the computer incorporating the network interface, and the media interface 38 is in turn coupled to the media connecting the host computer system to an ATM switch. Together, these elements 22–38 cooperate to asynchronously transfer data between the host computer and the other computers in the network through multiple dynamically allocated channels in multiple bandwidth groups.

As will be obvious from the descriptions to follow, collectively, these elements 22–38 behave as a multi-channel (virtual) intelligent direct memory access (DMA) controller coupled to the system bus of the host computer system. Furthermore, they shield the cell delineation detail of asynchronous transfer from the applications running on the host computer system. For the purpose of describing the present invention, it is assumed that applications running on the host computer system manage transmit and receive data using wrap around transmit and receive rings with packet interfaces. However, it will be appreciated that the present invention may be practiced with the applications running on the host computer system managing transmit and receive data using other data structures.

Still referring to FIG. 2, the control memory 30 is used for storing time critical control and state information for a number of virtual direct memory access (DMA) channels. Beside the standard DMA control and state information, application specific information regarding the data being transferred are also stored for each virtual DMA channel. The control and state information for the various DMA channels are accessed and updated by common resources in the network interface 20 and on the host computer, i.e. the computer incorporating the network interface of the present invention. Thus, a large number of virtual DMA channels may be advantageously provided by the network interface 20. The control memory 30 is intended to represent a broad category of high speed memory found in most computers, whose constitutions and functions are well known, and will not be described further. The content of the control memory 30, will be described in further detail below, with references to FIGS. 3–8.

The arbiter 32 is used to arbitrate accesses to the control memory 30, and the data bus 34 is used to transfer data between the control memory 30 and the accessor, thereby facilitating asynchronous transmit and receive. The data bus 34 is also intended to represent a broad category of high speed buses found in most computers, whose constitutions and functions are well known, and will not be described further. The arbiter 32 will be described in further detail below, with references to FIG. 9.

Still referring to FIG. 2, the SAR module 22 is used for segmenting transmit packets into transmit cells for transmissions, and reassembling receive cell payloads into receive packets. The SAR module 22 cellifies transmit packets and reassembles the receive packets on the host computer. The SAR module 22 comprises segregated cellification and reassembly logic to facilitate asynchronous cellification and reassembly of transmit and receive packets. The MCM module 24 is used for packing the transmit cell payloads of transmit packets before transmission, and unpacking receive cells for subsequent reassembly into receive packets. Similarly, the MCM module 24 comprises segregated packing and unpacking logic to facilitate asynchronous packing and unpacking of transmit and receive cell payloads. The TX and RX FIFOs, 26 and 28, are used to stage the transmit and receive cell payloads of the transmit and receive packets respectively. Separate TX and RX FIFOs, 26 and 28 are used to facilitate asynchronous staging of transmit and receive cell payloads. The SAR and MCM modules, 22 and 24, the TX and RX FIFOs, 26 and 28, and the manners in which they cooperate with each other, the control memory 30 and its arbiter 32 and data bus 34, the bus and media interfaces 36 and 38, will be described in further detail below, with references to FIGS. 10–18.

The bus interface 36 is used for transferring transmit and receive payloads, and transmit and receive control data, between the system bus of the host computer and the network interface. The media interface 38 is used for transferring transmit and receive payloads between the network interface and the connecting medium. One embodiment of the bus interface 36, and one embodiment of the media interface 38, will be described in further detail below, with references to FIGS. 19–21.

Figure 4:
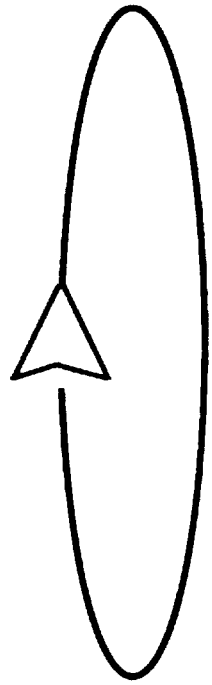

Referring now to FIGS. 3–5, three block diagrams illustrating the memory architecture of the network interface of the present invention is shown. Shown in FIG. 3 is the memory layout for transmit 68 comprising a transmit initialization memory block 70, a BWG table memory block 72 and a TX DMA state memory block 74 in the control memory, and a number of transmit data memory blocks 76–80 in the host computer's memory. The transmit data memory blocks 76–80 comprise a transmit descriptor ring memory block 76, a transmit completion ring memory block 78, and a transmit data buffer block 80.

The transmit initialization memory block 70 is used to store two pointers pointing to one of the transmit descriptor ring and the transmit completion ring. The BWG table memory block 72 is used to store a BWG table comprising a number of BWG index entries. The TX DMA state memory block 74 is used to store TX DMA states. The transmit descriptor ring memory block 76 and the transmit completion ring memory block 78 are used to store transmit descriptor rings and a transmit completion ring respectively. The transmit data buffer memory block 80 is used to allocate transmit data buffers for buffering transmit data.

Also shown in FIG. 3 is the memory layout for receive 82 comprising a receive initialization memory block 84, a RX DMA state memory block 86 in the control memory, and a number of receive data memory blocks 88–94 in the host computer system's memory. The receive data memory blocks 88–94 comprise a number of free buffer ring memory blocks (two shown), 90 and 92, a receive completion ring memory block 92, and a receive data buffer memory block 94.

The receive initialization memory block 84 is used to store two pointers pointing to one of the free buffer rings and the receive completion ring. The RX DMA state memory block 86 is used to store RX DMA states, one for each virtual DMA channel. The free buffer ring memory blocks, and the receive completion ring memory blocks, 88–92, are used to store free buffer rings of particular sizes and a receive completion ring. The receive data buffer memory block 94 is used to allocate receive data buffers for buffering receive data.

Still referring to FIG. 3, in one embodiment, the transmit initialization block is large enough to hold the two pointers, with each pointer being one word in size. The BWG table memory block 80 is large enough to store a BWG table comprising 4800 BWG indices, with every four BWG indices occupying one word. The TX DMA state memory block 82 is large enough to store 255 TX DMA states, with each TX DMA state occupying eight words. Additionally, the receive initialization memory block 84 is large enough to store two pointers, with each point being one word in size. The RX DMA state memory block 86 is large enough to store 1024 RX DMA states for 1024 corresponding virtual DMA channels, with each RX DMA state of a virtual DMA channel occupying eight words. Furthermore, there are two free buffer rings for receive, one for large buffers, and one for small buffers.

While the memory based virtual DMA channels in the context of the ATM network interface are being described as having separate memory areas for storing TX and RX DMA states, it will be appreciated that the memory based virtual DMA channel aspect of the present invention may be practiced in other network interface or non-network interface applications without having separate memory areas for "in-bound" and "out-bound" DMA states.

Referring now to FIGS. 4–6, three block diagrams illustrating an exemplary BWG table, an exemplary transmit descriptor format, an exemplary transmit completion descriptor format, an exemplary receive free buffer descriptor format, an exemplary receive completion descriptor format, an exemplary TX DMA state format, and an exemplary RX DMA state format for the above described embodiment are shown. Shown in FIG. 4 is an exemplary BWG table 96 comprising 4800 BWG index entries, with every four BWG indices occupying one word. The BWG indices range from 0–255, with 1–255 indexing one of the 255 TX DMA states stored in the TX DMA state memory block, and 0 indexing the null DMA state. For the particular embodiment, the exemplary BWG table is accessed from top to bottom and from left to right in a wrap-around manner as illustrated.

Shown in FIG. 5 is an exemplary transmit descriptor format 98 comprising four words of descriptor information. Word zero comprises a number of control bits, a packet length field and a buffer length field. The control bits are used to indicate various control status, in particular, whether the descriptor is owned by the network interface of the present invention. Additionally, the control bits may indicate the start and end of a buffer chain for buffer chaining. Furthermore, the control bits may indicate packet types of different protocols. The current packet length field indicates the length of the packet currently being transmitted, and the current buffer length field indicates the size of the remaining data to be transmitted from the current buffer. Word one comprises the current buffer pointer pointing to the transmit buffer. Word two comprises a cell header field for storing the cell header to be inserted for every cell. Word three comprises an optional packet control and packet tail length for certain packet types of certain protocols.

For this embodiment, it is assumed that each transmit descriptor ring is mapped on a 4K boundary, with each descriptor in the ring having a fixed size of four words, giving a total of 256 descriptors per descriptor ring. Furthermore, there is no restriction on start of data buffer alignment boundary.

Also shown in FIG. 5 is the exemplary transmit completion descriptor format 100 comprising four words with one word having descriptor information. Word zero comprises a number of control bits and a BWG index. The number of control bits indicate various control status, in particular, whether the particular descriptor is available for the network interface to post update on a packet having been transmitted. The BWG index points to the BWG which contains the packet that was just transmitted. Words one through three are unused.

Similarly, the exemplary receive free buffer descriptor format 102 comprises four words with one word having descriptor information. Word zero comprises a number of control bits, and a start buffer pointer. The number of control bits indicate various control status, in particular, whether the corresponding free buffer has been allocated to the network interface for storing a received packet. The start buffer pointer points to the start of the free buffer for storing the first word of the received packet. For this embodiment, each free buffer is aligned on a 16 byte boundary.

The exemplary receive completion descriptor format also comprises four words with three words having descriptor information. Word zero comprises a number of control bits, a cell congestion count field (CGN), and a packet length field. The number of control bits indicate various control status, in particular, whether the network interface has posted a received packet to the user, whether the receive buffer has overflown, and whether CRC error is detected. The CGN is used to store the number of cells currently marked as experiencing congestion, and the packet length field is used to store the packet length. For this embodiment, the packet length is in units of 48 byte payloads. Word one comprises a start buffer pointer pointing to the beginning of the received packet. For this embodiment, the beginning of the received packet is aligned at 16 byte boundary.

Shown in FIG. 6 is the exemplary TX DMA state format 106 comprising eight words of control and state information. Word zero comprises a number of control bits, a current packet length field, and a current buffer length field. The control bits, the current packet length and the current buffer length are copied from the corresponding transmit descriptor. Word one and two comprise a current buffer pointer and a transmit cell header which are also copied from the corresponding transmit descriptor. The transmit cell header comprises a virtual channel identifier (VCI).

Word three comprises a BWG on/off indicator indicating whether the corresponding BWG is on or off. Word four comprises a transmit data ring base pointer pointing to the start of the current transmit descriptor ring, and a transmit descriptor ring offset pointer pointing to the current descriptor of the current transmit descriptor ring. Word five comprises a BWG cell counter indicating the number of data cells sent for the corresponding BWG. Word six comprises the calculated partial packet CRC. Word seven comprises an optional packet control and packet tail length for certain packet types.

Also shown in FIG. 6 is the exemplary RX DMA state format 108 comprising eight words with six words having state information. Word zero comprises a number of control bits, a cell congestion count field (CGN), and a current end of packet/length field. The control bits are used to indicate various control status. They are copied from the corresponding receive free buffer. The CGN is used to track the number of incoming cells having been marked as experiencing congestion. The current end of packet/length is to used to track the buffer length or packet length status. For this embodiment, the length is in unit of cells. Word one comprises a current buffer pointer which is copied from the corresponding free buffer ring descriptor. Word two comprises a start of buffer pointer pointing to the start of the allocated buffer for receiving the incoming cells. Word three comprises additional control bits, an end of packet length field and a buffer length field. The additional control bits indicate various additional control status, in particular, whether a virtual DMA channel is on or off, the free buffer ring type, and the end of packet type. The end of packet/buffer length indicates the size of the allocated receive buffer. For this embodiment, the length is in unit of 48 byte payloads. Word four comprises an end of packet mask for end of packet detection. Word five comprises the calculated partial CRC for the packet being received. Word six and seven are not used.

Figure 7:
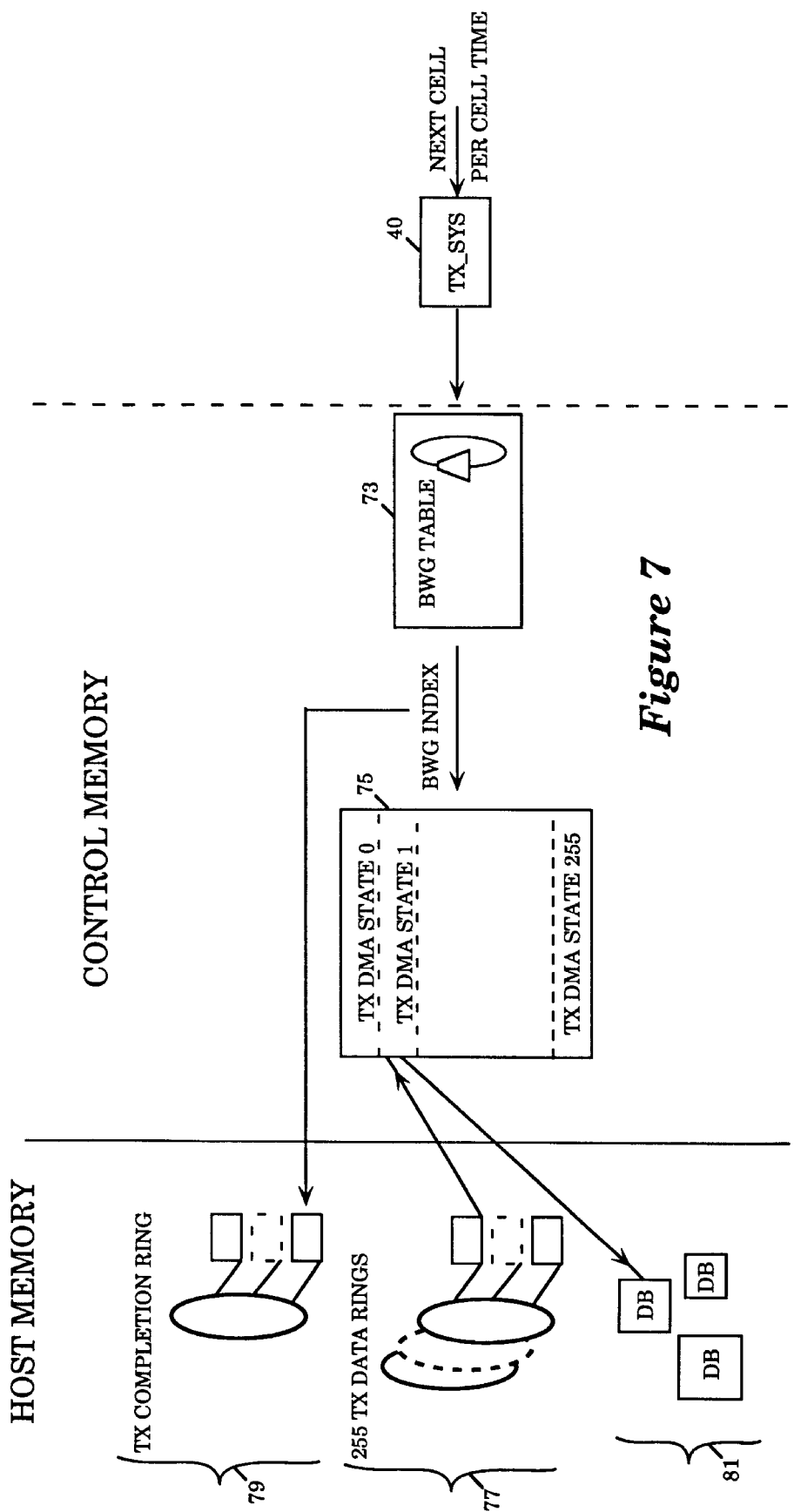

Referring now to FIG. 7, a block diagram illustrating the interrelationship between the BWG table, the TX DMA states, the TX completion ring, the TX data ring, and the TX data buffers is shown. As illustrated, the retrieved BWG index entries from the BWG table 73 are used to access the corresponding TX DMA states 75. The TX transmit data ring pointers and the TX descriptor ring offset pointers in the indexed TX DMA states 75 are in turn used to access the corresponding TX data ring descriptor. Each TX descriptor ring has a pre-assigned bandwidth rate. The control information in the TX data descriptor 77 are transferred into the TX DMA states 75. The transferred control information in the TX DMA states 75 are used to access the transmit data in the TX data buffers 81. Additionally, the retrieved BWG indices are posted in the TX completion ring 79.

Thus, by selectively queueing transmit data in the data rings of the various transmit descriptor rings having pre-assigned bandwidth rates, and programming the appropriate indexing information into a transmit DMA state and a BWG index entry, an application may select a bandwidth rate for a particular transmission. For the above described embodiment, bandwidth rates in the range from 32 kbps to 154 kbps are assigned to the various transmit descriptor rings.

Figure 8:
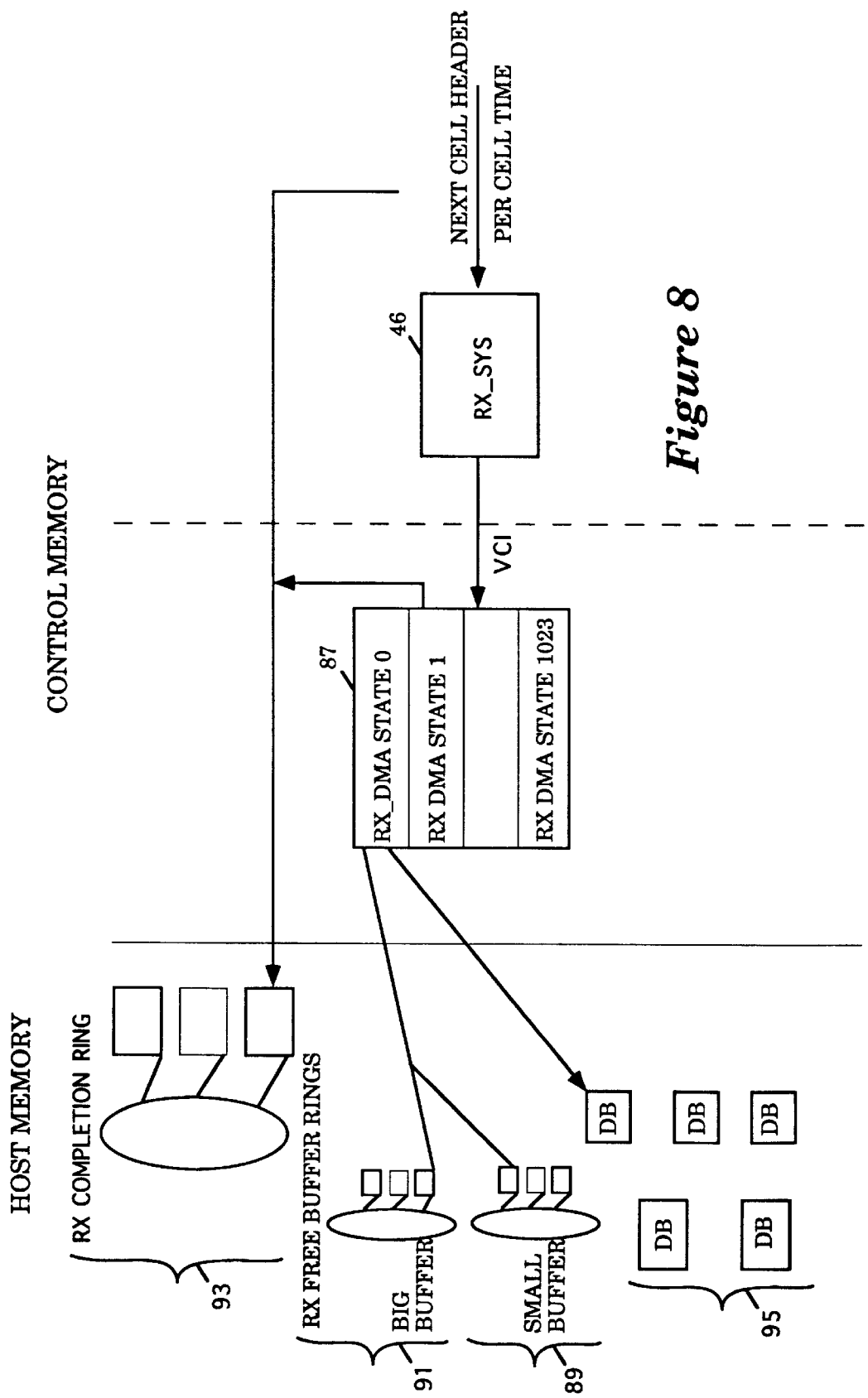

Referring now to FIG. 8, a block diagram illustrating the interrelationship between the RX DMA states, the RX completion ring, and the RX free buffer ring is shown. As illustrated, the virtual DMA channel identifiers (VCI) are used to access the RX DMA states 87. The control information in the RX free buffer rings, 89 and 91, are transferred into the RX DMA states 87. The transferred control information in the RX DMA states 87 are used to write the receive data into the RX data buffers 95. Additionally, the updated control information and the cell headers are posted in the RX completion ring 93.

While the dynamic bandwidth selection aspect of the present invention has been described in the context of the ATM network interface of the present invention, it will be appreciated that the dynamic bandwidth selection aspect of the present invention may be practiced with other non-network interface I/O applications. Similarly, while the host based cellification of transmit packets and reassembly of receive packets aspect of the present invention have been described in the context of the ATM network interface of the present invention, it will be appreciated that the host based cellification of transmit packets and reassembly of receive packets of the present invention may be practiced with other non-ATM cell based network interfaces.

Figure 9:
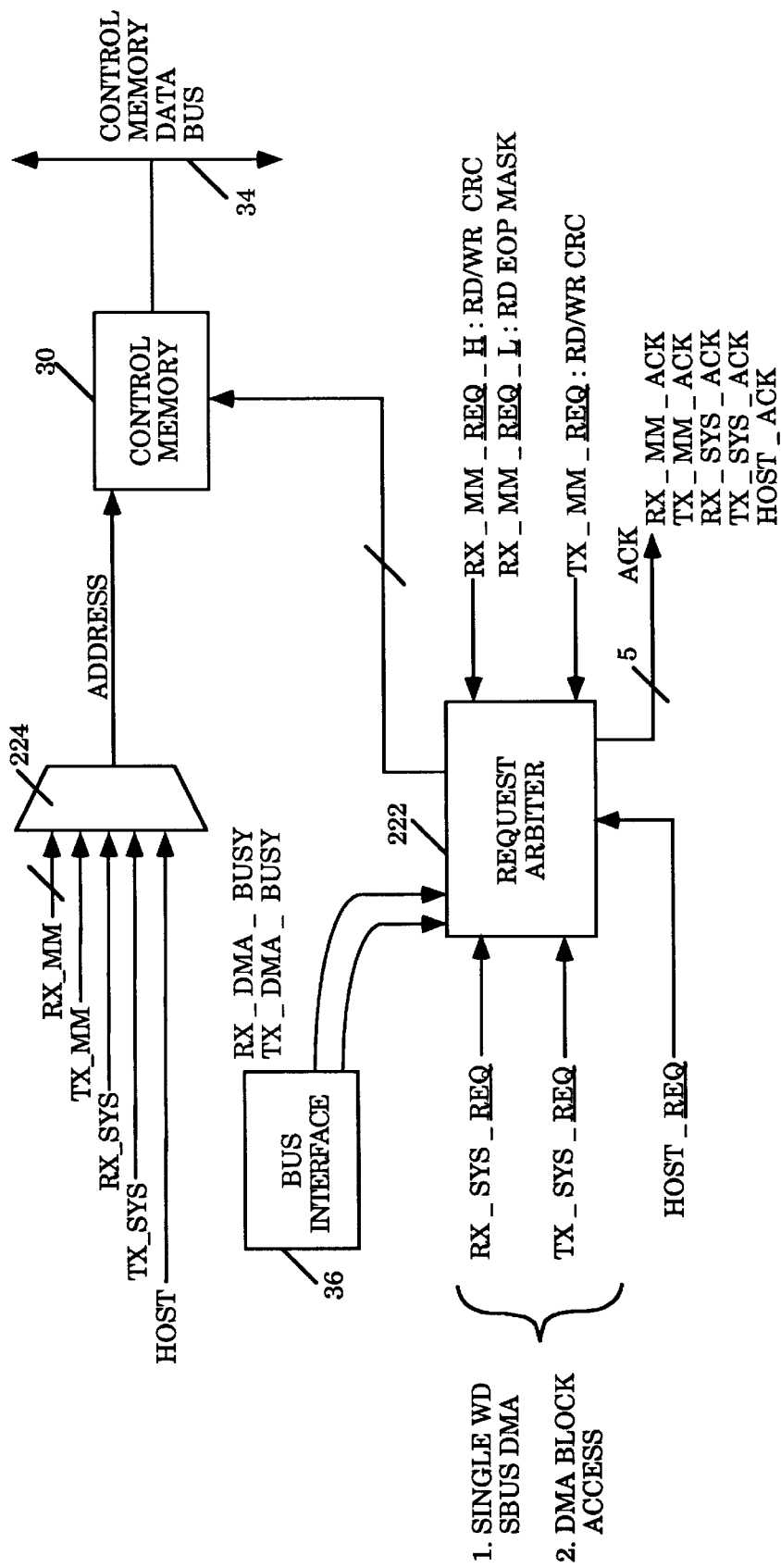
FIG. 9 illustrates the control memory arbiter in further detail.

Referring now to FIG. 9, a block diagram illustrating the control memory arbiter of the present invention in further detail is shown. Shown is the request arbiter 222 of the control memory arbiter arbitrating requests from the host, TX_Sys and RX_Sys of the SAR module, and TX_med and RX_med of the MCM module. The request arbiter 222 also receives various busy signals from the bus interface 36. In response, the request arbiter 222 generates various control signals to the control memory 30, and acknowledgment signals to the requesters. Also shown is the address multiplexor 224 selectively providing the various addresses received from the requesting logic to the control memory 30.

In the above described embodiment, the request arbiter 222 priorities the requests from the various requesters as follows (1=highest):

1. RX_Med access for a CRC.
2. TX_Med access a CRC.
3. RX_Med access for an EOP mask.
4. RX_Sys or TX_Sys access for a DMA state.
5. Host access.

Figure 10:
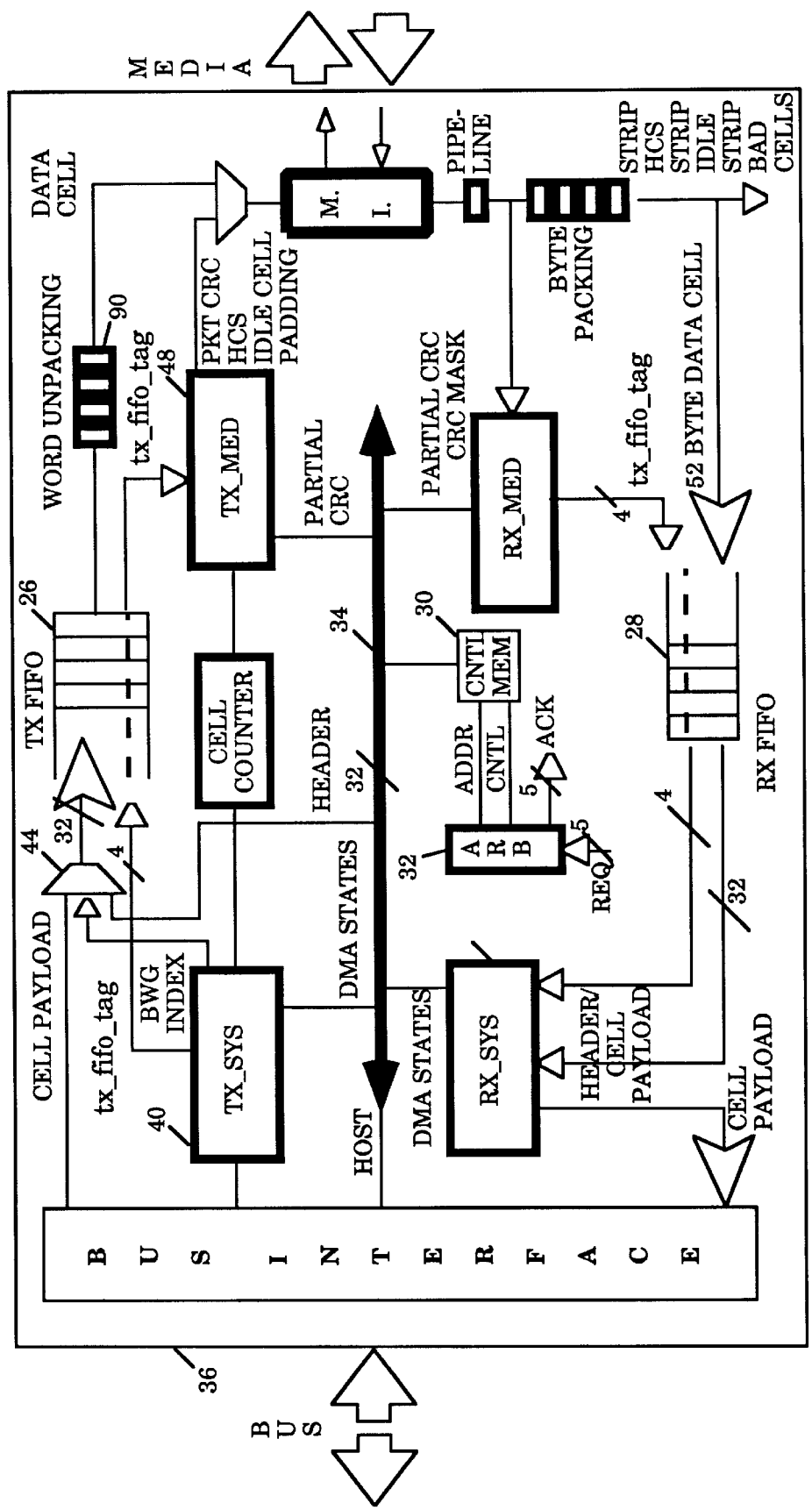
FIG. 10 illustrates the architecture and data flow of the network interface of the present invention in further detail, showing the transmit assembly block and the receive reassembly block of the SAR module, and the transmit cell manager block and the receive cell manager block of the MCM module.

Referring now to FIG. 10, a block diagram illustrating the architecture and data flow of the network interface of the present invention in further detail is shown. Shown are some of the key elements of the SAR module, in particular, the transmit segmentation control block (TX_Sys) 40, the transmit cell counter 42, the transmit staging multiplexor 44, and the receive reassembly control block (RX_Sys) 46. The TX_Sys 40 is coupled to the control memory data bus 34, the TX FIFOs 26, the transmit cell counter 42, and the transmit staging multiplexor 44. The transmit staging multiplexor 44 is coupled to the control memory data bus 34 and the TX FIFOs. The RX_Sys 46 is coupled to the RX FIFOs 28 and the control memory data bus 34.

Together the TX_Sys 40, the transmit cell counter 42 and the transmit staging multiplexor 44 cooperate to segment transmit packets into transmit cell payloads and stages them in the TX FIFOs 26 for transmissions. The TX_Sys 40, during every cell time opportunity, retrieves a BWG index entry and the control and state information of a transmit DMA stored in the transmit DMA state from the control memory 30, including a transmit cell header. Depending on the fullness of the TX FIFOs 26, the TX_Sys 40, through the bus interface 36, causes sufficient data for a transmit cell payload to be burst from the host computer to the transmit staging multiplexor 44. The TX_Sys 40 also provides the retrieved BWG index, and the transmit cell header stored as part of the retrieved transmit DMA state to the transmit staging multiplexor 44. The TX_Sys 40 selectively pushes the BWG index, the transmit cell header, and the transmit cell payload of the transmit packet through the transmit staging multiplexor 44 into the TX FIFOs 26 along with the appropriate transmit FIFO tags (tx_fifo_tag). The tx_fifo_tags are used to differentiate the BWG index, the transmit cell header, and the transmit cell payload, and provide control information to the TX_Med 48. Additionally, the TX_Sys 40 updates a transmit cell count in the transmit cell counter 42, and the retrieved transmit DMA state in the control memory 30.

The RX_Sys 46 reassembles the staged receive cell payloads in the RX FIFOs 28 into receive packets, transferring the staged receive cell payloads to the system bus via the bus interface 36. The RX_Sys 46, during every cell opportunity, depending on the fullness of the RX FIFOs 28, pops an unpacked receive cell payloads or a receive cell header, along with its receive FIFO tag (rx_fifo_tag) from the RX FIFOs 28. The rx_fifo_tags differentiate the receive cell payloads and the receive cell headers, and provide control information to the RX_Sys 46. The RX_Sys 46 derives the VCI from the popped receive cell header, and retrieves the corresponding receive DMA state stored in the control memory 30. The RX_Sys 46 then, through the bus interface 36, causes the popped receive cell payloads to be burst to the host computer accordingly. Additionally, the RX_Sys 46 updates the retrieved receive DMA state in the control memory 30.

Also shown are some of the key elements of the MCM module, in particular, the transmit packing control block (TX_Med) 48, the unpacking registers 50, the transmit media multiplexor 52, the receive unpacking control block (RX_Med) 54, the pipeline 56, and the packing registers 58. The TX_Med 48 is coupled to the TX FIFOs, the transmit media multiplexor 52, and the control memory data bus 34. The unpacking registers 50 are coupled to the TX FIFOs 26 and the transmit media multiplexor 52. The transmit media multiplexor 52 is in turn coupled to the media interface 38. The RX_Med 54 is coupled to the RX FIFOs 28, the control memory data bus 34, and the pipeline 56. The pipeline 56 is also coupled to the packing registers 58, which in turn are coupled to the RX FIFOs 28.

Together the TX_Med 48, the unpacking registers 50 and the transmit media multiplexor 52 cooperate to package the staged transmit cell payloads before transferring them to the media through the media interface 36. The TX_Med 48, during every cell opportunity, depending on the fullness of the TX FIFOs as indicated by the transmit cell counter of the SAR module, pops the BWG index, the transmit cell header, and the transmit cell payload of a transmit cell of a transmit packet along with the tx_fifo_tags from the TX FIFOs 26. The unpacking registers 50 unpack the popped transmit cell payload and provide it to the transmit media multiplexor 52. The TX_Med 48 retrieves the transmit DMA state indexed by the popped BWG index including the partial cyclic redundancy check (CRC) value from the control memory 30. The TX_Med 48 then generates a new transmit packet CRC value, the transmit cell header checksum (HCS), idle cells and paddings for the transmit media multiplexor 52 accordingly. The new transmit packet CRC is generated based on the retrieved partial CRC value. The transmit media multiplexor 52 through the media interface 38 selectively transfers the transmit cell payloads etc. to the connecting medium. Additionally, the TX_Med 48 updates the transmit cell count in the transmit cell counter 42, and updates the retrieved transmit DMA states in the control memory 30 including the partial CRC value. The partial CRC value is updated with the newly generated transmit packet CRC value.

Together, the RX_Med 54, the pipeline 56, and the packing registers 58 cooperate to unpack receive cells received from the connecting medium through the media interface 38 and stage them for subsequent reassembly into receive packets. The RX_Med 54, at every cell time opportunity, depending on the fullness of the RX FIFOs, causes a receive cell header to be provided from the pipeline 56 to itself, and the remaining content of the receive cell to be provided from the pipeline 56 to the packing registers. The packing registers 58 strip the HCS and idle cell, pack the receive cell header and receive cell payload. The RX_Med 54 derives the VCI from the receive cell header, and retrieves the corresponding receive DMA state including the partial CRC and the end of packet (EOP) mask from the control memory 30. The RX_Med 54 then pushes the unpacked receive cell header and cell payload to the RX FIFOs 28 along with the appropriate tx_fifo_tags.

Additionally, the RX_Med 54 updates the retrieved receive DMA state in the control memory 30.

These various elements of the SAR module, 40–46, and the MCM module 48–58, and the manner they cooperate with each other and the control memory 30 its arbiter 32 and data bus 34, will be described in further detail below with references to FIGS. 11–17.

Still referring to FIG. 10, in one embodiment, the frame size of the media interface is 53 bytes, the data cell being 52 bytes. The TX FIFOs 26 and the RX FIFOs 28, are 36 bit wide and 512 deep. The transmit/receive cell payloads are 32 bits, and the tx/rx_fifo_tags are 4 bits. The TX_Sys 42, at every cell time opportunity, causes sufficient data for a transmit cell payload to be burst, if the TX FIFOs 26 are 8 words empty. The RX_Sys 46, at every cell time opportunity, pops a receive cell header, and a receive cell payload, if the RX FIFOs 28 are at least 13 words full. The TX_Med 48 at every cell time opportunity, pops a BWG index, a transmit cell header, and a transmit cell payload, if the TX FIFOs 26 are at least one transmit cell full. The RX_Med 54 at every cell opportunity, pushes a receive cell header and a receive cell payload, if the RX FIFOs 28 are at least one cell empty. The bus interface 36 supports 4 or 8 word data bursts for transmit cell payload transfer between the system bus and the network interface. The bus interface 36 also supports single word data access for control data transfer between the host computer and the control memory 30.

While the incremental CRC calculation aspect of the present invention has been described in the context of the ATM network interface of the present invention, it will be appreciated that the incremental CRC calculation aspect of the present invention may be practiced in other non-ATM cell based network interfaces.

Referring now to FIG. 11, a diagram illustrating the tx_fifo_tags, and the rx_fifo_tags of the above described embodiment is shown. Shown are two tables 60 and 66 comprising fourteen tx_fifo_tags and five rx_fifo_tags for the above described embodiment. Ten of the fourteen tx_fifo_tags identify valid transmit cell payloads. The remaining four tx_fifo_tags are used to provide control information to TX_Med, including instructing TX_Med to start padding and include CRC (0000), start padding without including CRC (0101), generate an idle cell (1001), initialize CRC to zero (1011) (beginning of the packet, i.e. header). Additionally, each of the ten tx_fifo_tags that identify valid transmit cell payloads also identifies the valid bytes of a valid transmit cell payload, thus allowing the transmit data to be only required to be byte boundary aligned without any other boundary alignment requirement.

Still referring to FIG. 11, the first rx_fifo_tag identifies a valid receive cell payload entry, while the remaining four rx_fifo_tags identify the receive packet header entry, the last word of a receive packet with or without CRC error, and the last word of a receive cell payload.

While the cell tag aspect of the present invention has been described in the context of the ATM network interface of the present invention, it will be appreciated that the cell tag aspect of the present invention may be practiced with other non-ATM cell based network interfaces.

Figure 12:
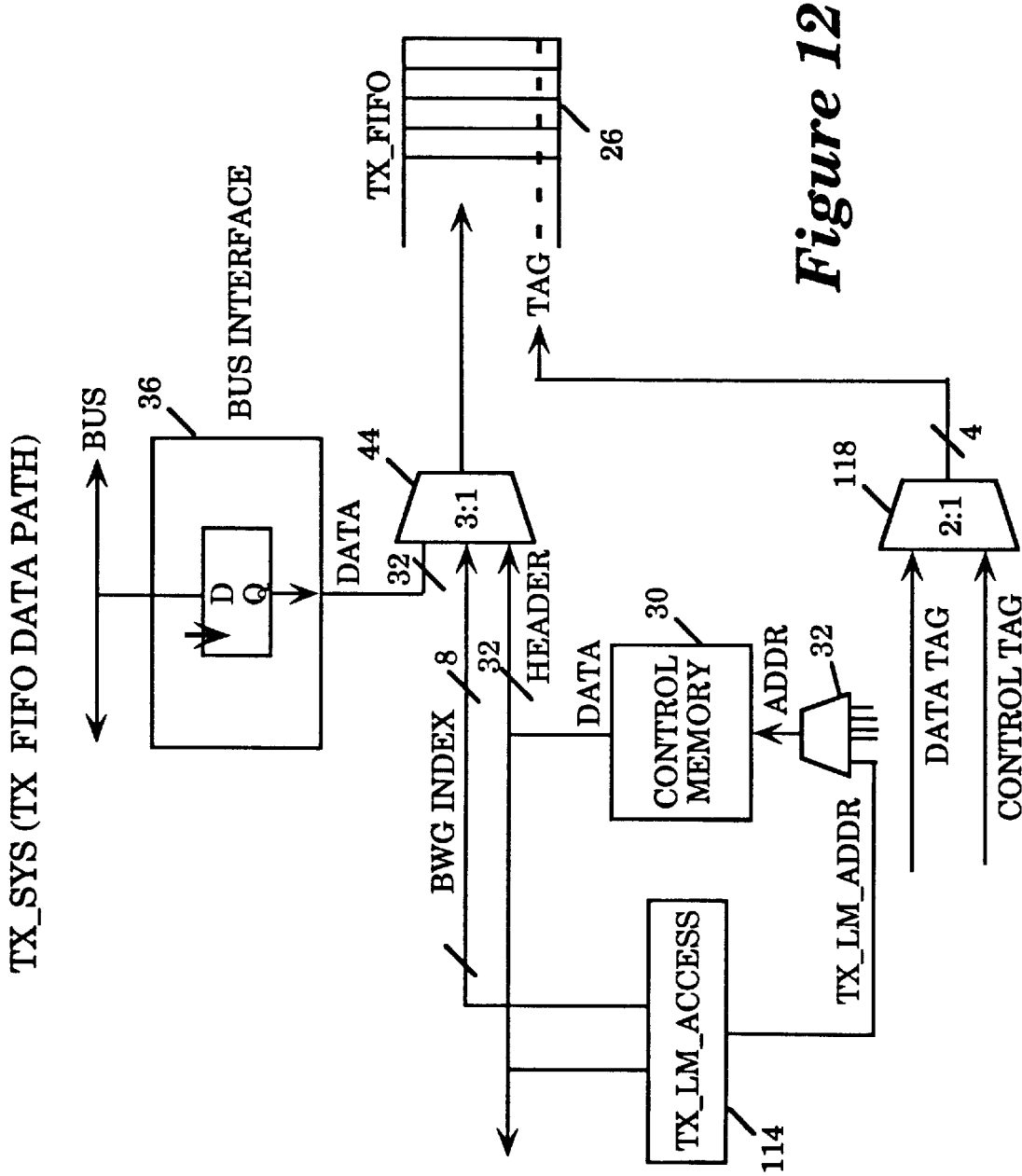
FIGS. 12–14 illustrate the transmit segmentation control block of the SAR module in further detail.

Referring now to FIGS. 12–16, five block diagrams illustrating the TX_Sys to TX FIFOs data path, the TX_Sys to control memory data path, the TX_Sys buffer chaining, the RX_Sys to bus interface data path, and the RX_Sys to control memory data path, for the SAR module of the above described embodiment in further detail is shown. Shown in FIG. 12 are some of the key elements of TX_Sys for pushing data into TX FIFOs, in particular, the transmit memory access logic (TX_lm_access) 114, and the two multiplexors 44 and 118. The TX_lm_access 114 is coupled to the control memory data bus 34, the transmit staging multiplexor 44, and the control memory arbiter 32. The TX_lm_access logic 114 provides the transmit control memory access addresses (TX_lm_addr) to the control memory arbiter 32, retrieves the returning data from control memory 30 through the control memory bus 34, and provides BWG indices to the transmit staging multiplexor 44, which in turn selectively provides the BWG indices, the returning transmit cell header from control memory 30, and the transmit cell payloads from the bus interface 36 to the TX FIFOs 26. The multiplexor 118 receives the data tags and control tags as inputs, and in turn selectively provides them to the TX FIFOs 26.

Figure 13:
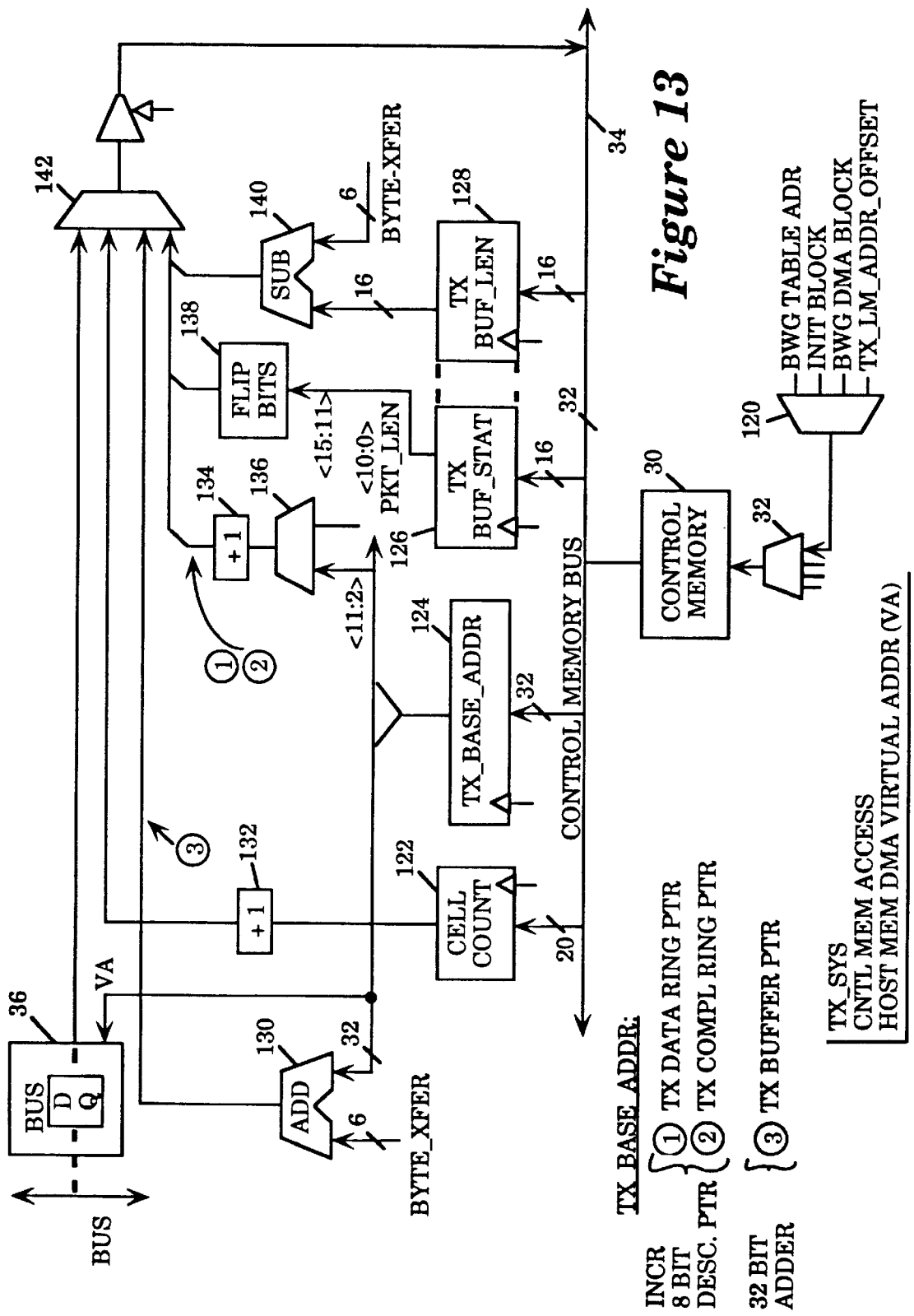

Shown in FIG. 13 are additional elements of the TX_Sys block for accessing control memory 30, in particular, the address multiplexor 120, the transmit cell count register 122, the transmit base address (TX_base_addr) register 124, the transmit buffer status (TX_buf_stat) register 126, and transmit buffer length (TX_buf_len) register 128. Also shown are various adder/subtractor, 130 and 140, incrementors, 132 and 134, invertor 138, and additional multiplexors, 136 and 142. The address multiplexor 120 is coupled to the control memory arbiter 32. The various registers 122–128 are coupled to the control memory bus 34, and the various "operators" 130–140, which are in turn coupled to the multiplexor 142 as shown. The various addresses for the BWG table, the transmit initialization block, the transmit DMA block, and transmit data address offset are provided to the control memory arbiter 32 through the address multiplexor 120. The returning data are provided to the various registers 122–128 through the control memory bus 34. For this embodiment, the transmit data ring pointer, the transmit completion ring pointer and the transmit buffer points shares the TX_base_addr register 124. The content of the various registers 122–128 are in turn modified through the "operators" 130–140, and written back into the control memory 30 through the multiplexor 142 and the control memory bus 34.

Figure 14:
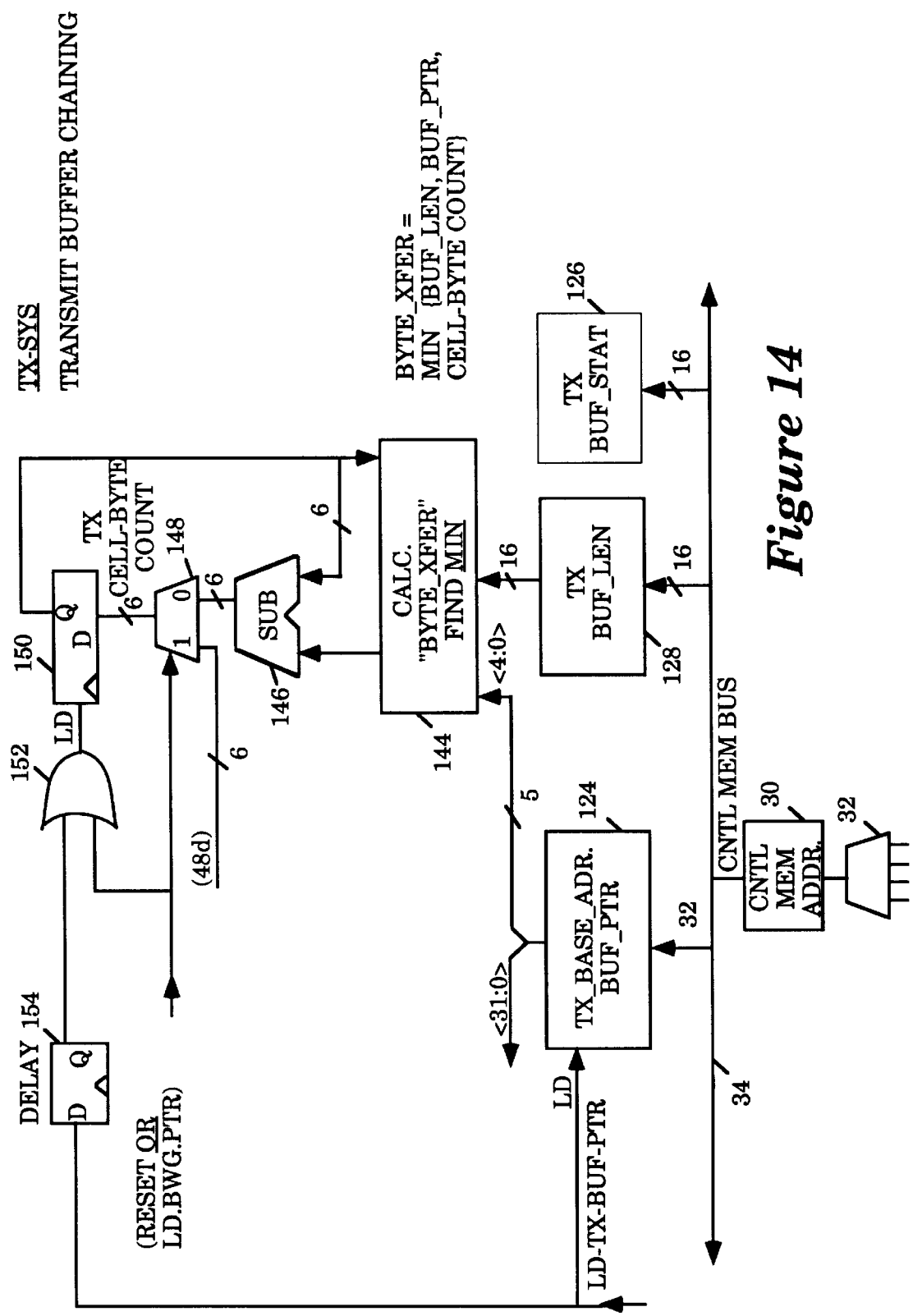

Shown in FIG. 14 are additional elements of the TX_Sys block for buffer chaining, in particular, the minimum value determinator 144, and the various elements for providing the current transmit cell byte count (TX_cell-byte-count) 146–154. The various elements 146–154 for providing TX_cell_byte-count comprise the subtractor 146, the multiplexor 148, the two flip-flops 150 and 154, and the OR gate 152. The minimum value determinator 144, and the various TX_cell_byte_count elements 146–154 are coupled to each other and to the various register 124–128 as shown. The minimum value determinator 144 is used to determine the minimum value among the buffer length, buffer pointer, and the cell byte count, which gives the number of bytes that can be pushed to the TX FIFOs on every 32 byte transmit burst.

Figure 15:
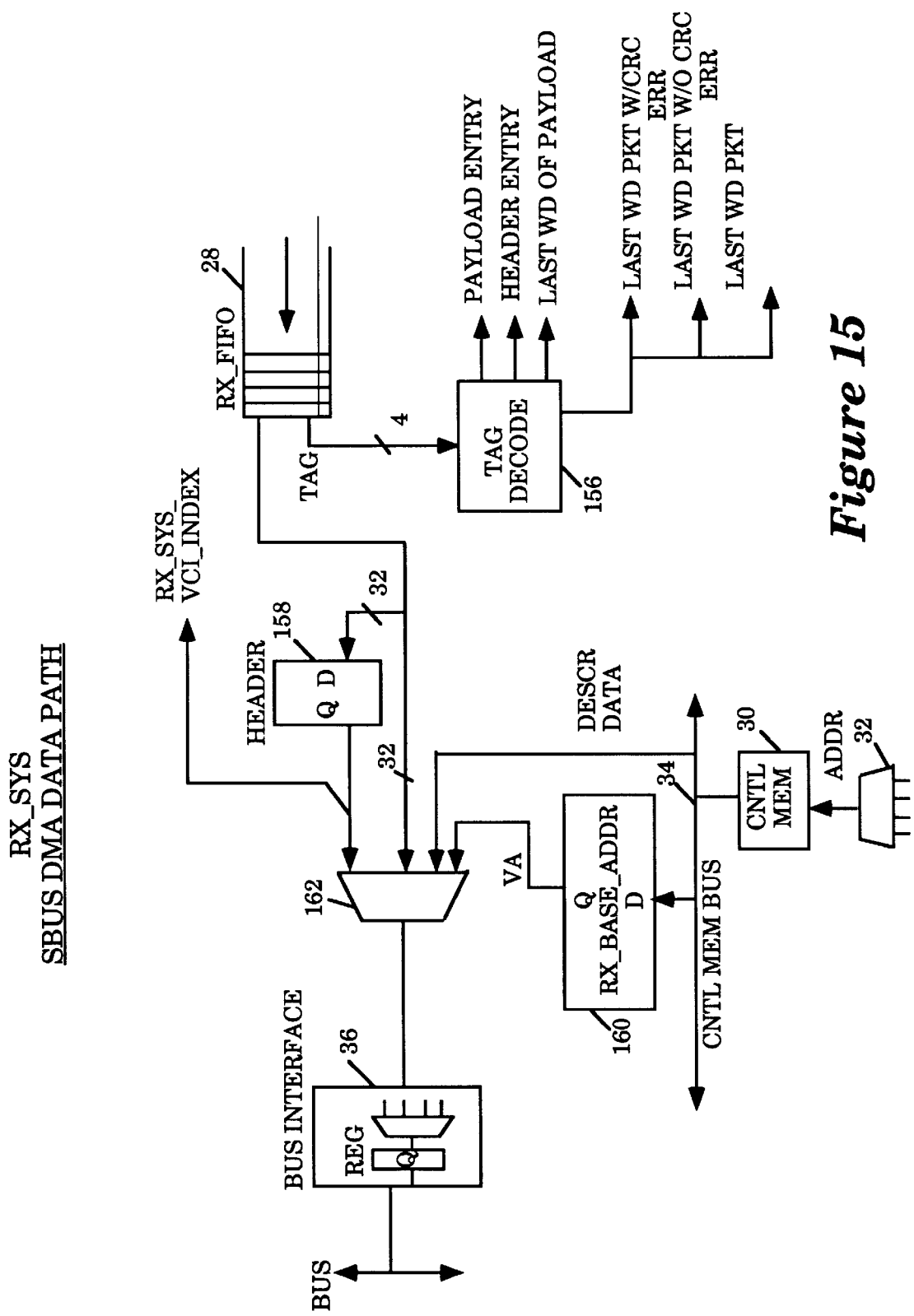
FIGS. 15–16 illustrate the receive reassembly control block of the SAR module in further detail.

Shown in FIG. 15, are some of the key elements of RX_Sys for popping data from the RX FIFOs 28 and transferring them to the bus interface 36, in particular, the rx_fifo_tag decoder 156, the flip-flop for storing cell headers 158, the free buffer base address register (RX_base_addr) 160, and the multiplexor 162 to the bus interface. The rx_fifo_tags popped from the RX FIFOs 28 are decoded by the rx_fifo_tag decoder 156. The cell headers popped from the RX FIFOs 28 are stored in the flip-flop 158 and in turn provided to the multiplexor 162. The multiplexor 162 is also provided with the cell payloads popped from RX FIFOs 28, the descriptor data retrieved from control memory 30, and base address of the allocated buffer, which in turn selectively provides them to the bus interface 36.

Figure 16:
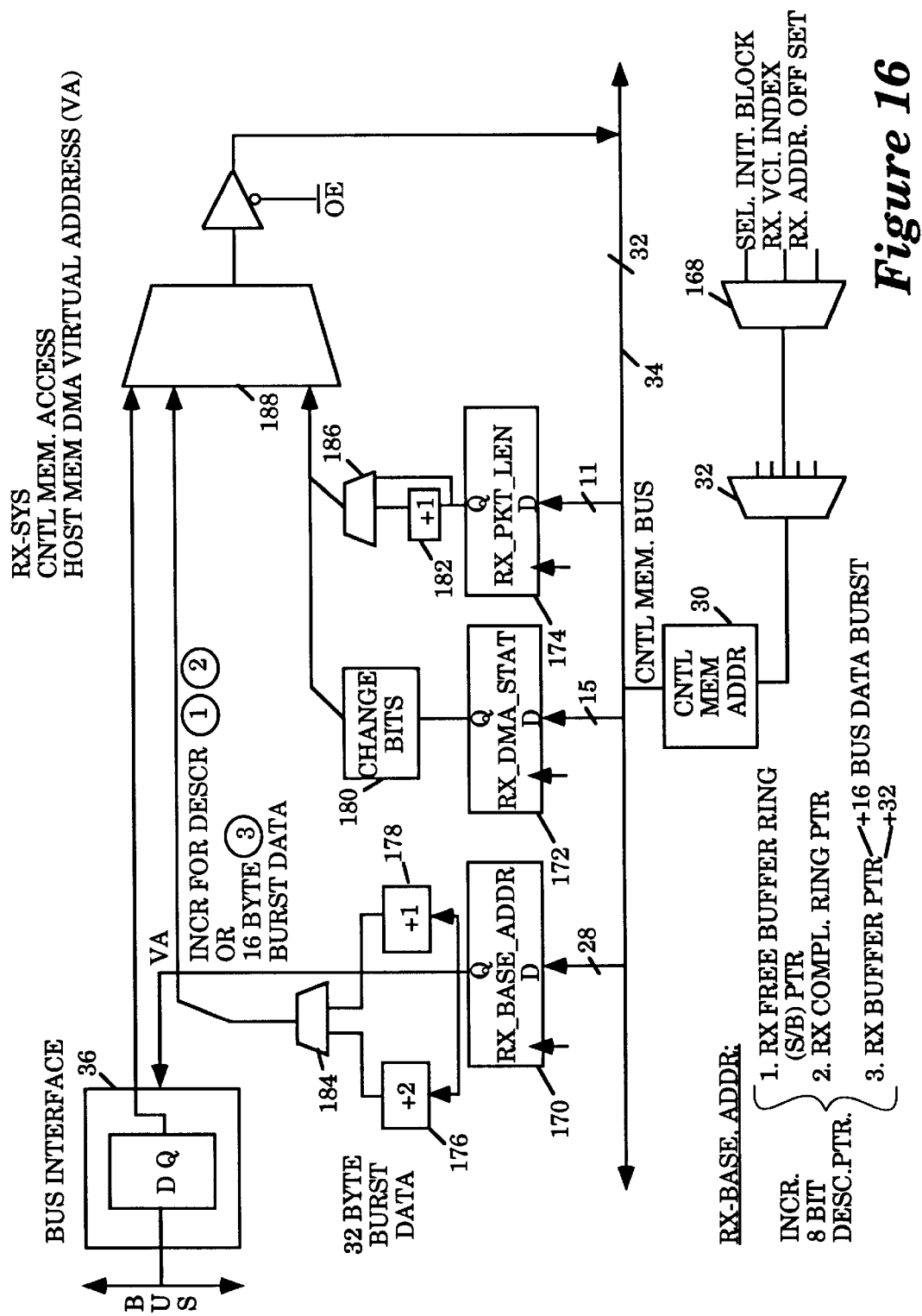

Shown in FIG. 16 are additional elements of the RX_Sys block for accessing control memory, in particular, the address multiplexor 168, the receive base address (RX_base_addr) register 170, the receive dma state (RX_buf_stat) register 172, and receive packet length (RX_pkt_len) register 174. Also shown are various incrementors, 176, 178 and 182, bit modifiers 180, and additional multiplexors, 184–188. The address multiplexor 168 is coupled to the control memory arbiter 32. The various registers 170–174 are coupled to the control memory bus 34, and the various "operators" 176–182, which are in turn coupled to the multiplexors 184–188 as shown. The various addresses for receive initialization block, receive VCI indices, and received data address offsets, are provided to the control memory arbiter 32 through the address multiplexor 168. The returning data are provided to the various registers 170 174 through the control memory bus 34. For this embodiment, the receive free buffer ring pointer, the receive completion ring pointer, and the receive buffer pointer share the RX_base_addr register 170. The content of the various registers 170–174 are in turn modified through the "operators" 176–186, and written back into the control memory 30 through the multiplexor 188 and the control memory bus 34.

Figure 17:
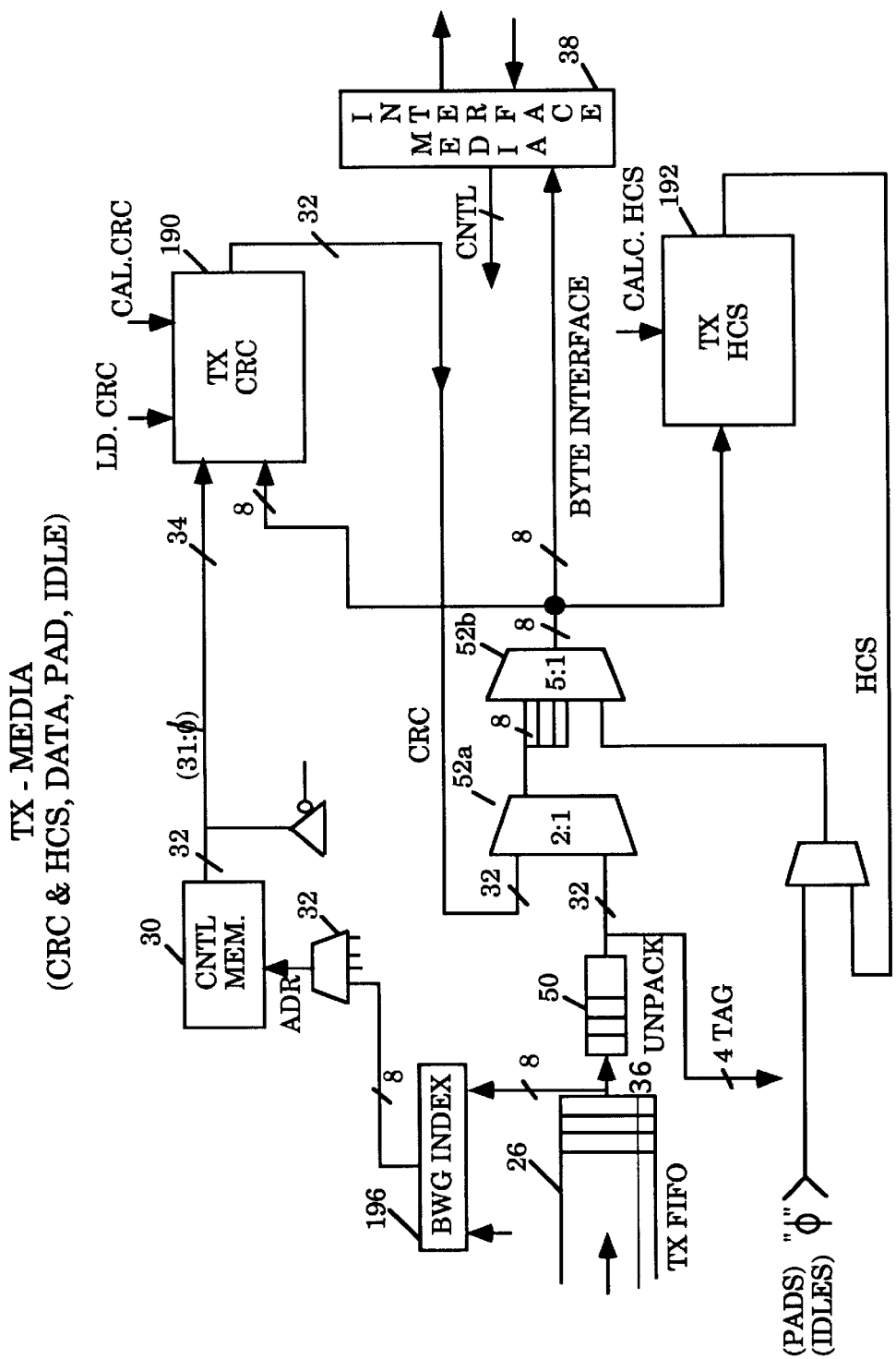
FIGS. 17–18 illustrate the TX_Media and RX_Media of the transmit packing control block, and the receive unpacking control block of the MCM module in further detail respectively.
Figure 18:
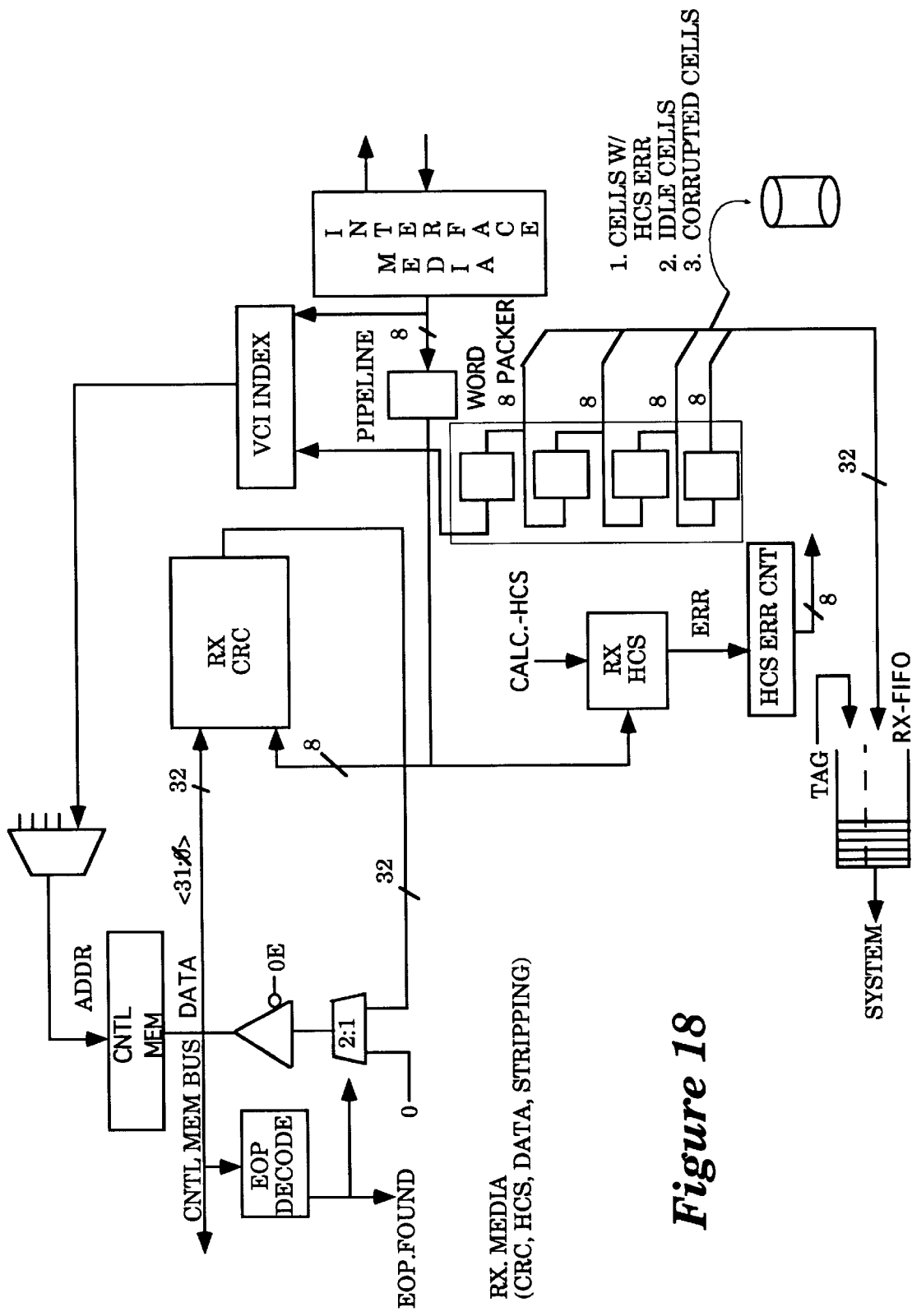

Referring now to FIGS. 17–18, two block diagrams illustrating the TX_Media to media interface data path and media interface to RX_Media data path, for the MCM module of the above described embodiment in further detail is shown. Shown in FIG. 17 are some of the key elements of TX Media for packing the cell payloads and transferring the packed cells to the media interface 38, in particular, the logics for generating partial CRCs and HCS (TX_crc and TX_hcs), 190 and 192, the byte counter 194, the FIFO for storing the BWG index 196, and the multiplexor 202. Also shown in further detail are the two stages 52a and 52b of the multiplexor (ref. 52) illustrated in FIG. 3. The unpacked cell payloads from the unpacking registers 50, and the generated CRCs from TX_crc 190 are provided to the stage one multiplexor 52a, which are in turn selectively provided the second stage multiplexor 52b. The second stage multiplexor 52b is also provided with paddings, idle cells, and the generated HCSs from TX_hcs 1192, which are in turn selectively provided to the media interface 38.

Additionally, the outputting packet CRC from the second stage multiplexor 52b is also provided as feedback to the multiplexor 202, which also receives the high order bits of the partial CRC from control memory 30, and in turn selectively provides them to TX_crc 190. TX_crc 190 also receives the lower order bits of the partial CRC from control memory 30 as inputs. The outputting HCSs are provided as feedback to TX_hcs 192. Furthermore, the tx_fifo_tags from the unpacking registers 50 are provided to TX_media_sm 200, and the BWG indices popped from TX FIFOs and stored into FIFO 196 are written back into the control memory 30.

Shown in FIG. 18 are some of the key elements of RX_Media for unpacking received cells from the media interface 38, in particular, the FIFO for storing the VCI index 204, the logics for generating the CRCs and checking the HCSs (RX_crc and RX_HCS), 206 and 208, the counter for keeping track the number of HCS errors 210, the end of packet decoder 212, and the various multiplexors 214 and 216. The media interface 38 provides the VCI indices to the FIFO 204, which in turns provides the VCI indices to the control memory 30 through the control memory arbiter 32, for accessing the corresponding RX DMA states. The media interface 38 also provides the CRCs, the HCSs and the cell payloads to the multiplexor 214, RX_hcs 208, and to the packing registers respectively. The multiplexor 214 also receives the low order bits of the partial CRCs from control memory 30, and in turn selectively provides its inputs to RX_crc 206. RX_crc 206 generates new CRCs and writes them back into the control memory through the multiplexor 216. RX_hcs 208 checks the received HCSs and updates the HCS error count in the error counter 210 if it detects HCS errors. The packing registers 58 repack the cell payloads, stripping cells with HCS error and idle cells, and provide the repacked cell payloads to RX FIFOs 28. The RX_media_sm 220 provides the rx_fifo_tags to RX FIFOs 28 for the payloads being push into RX FIFOs 28. The EOP decoder detects end of packet and generates either a EOP found signal or a control signal for the multiplexor 216.

Figure 19:
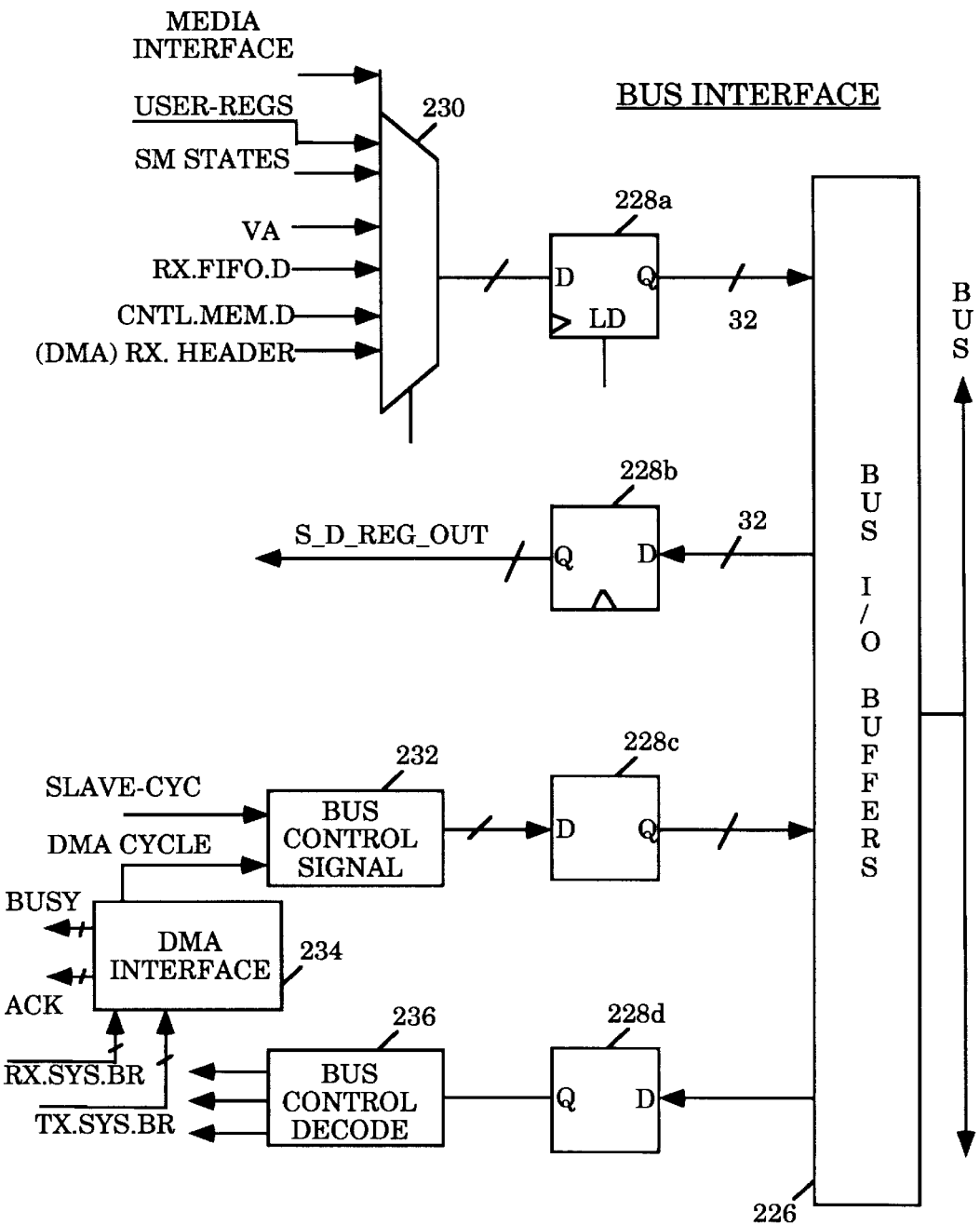
FIGS. 19–20 illustrate one embodiment of the bus interface.
Figure 20:
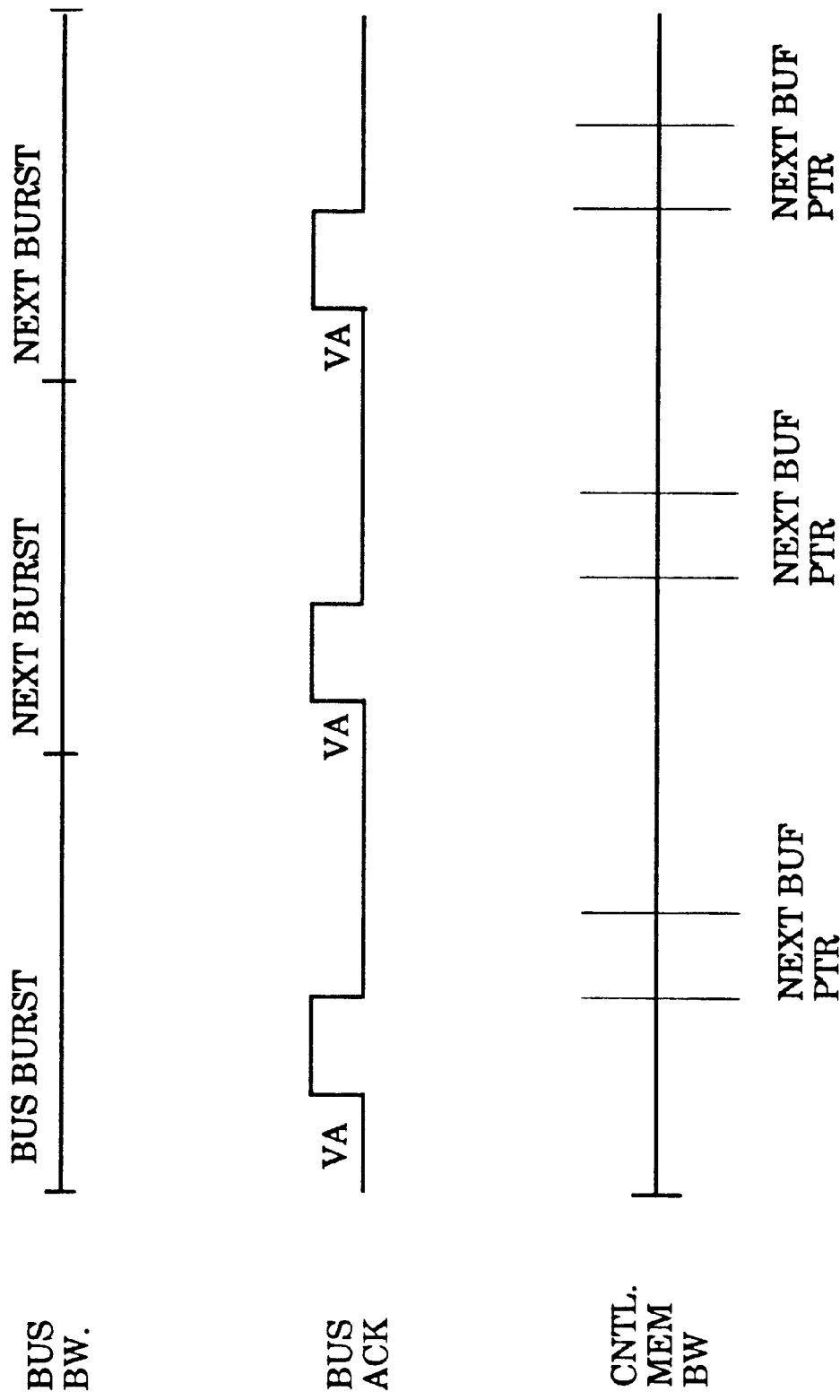

Referring now to FIGS. 19–20, a block diagram and a timing diagram illustrating the bus interface for the above described embodiment is shown. Shown in FIG. 19 are some of the key elements of the bus interface 36, in particular, the I/O buffers 226, the flip-flops 228a–228d, the multiplexor 340, the bus control signal generator 342, the DMA interface 344, and the bus control signal decoder 346. Data and addresses are selectively provided through the multiplexor 340 to the I/O buffers 226, which in turn provide them to the system bus. DMA accesses are made by TX_Sys and RX_Sys of the SAR module through the DMA interface 344. In response, the control signal generator 342 generates the appropriate DMA cycle control signals for the I/O buffers, which in turn provides them to the system bus. Control signals from the system bus are decoder by the decoder 226.

Shown in FIG. 20 are the timings for bus burst writes 348, bus acknowledgments 240, and control memory burst writes 242. The back to back bus bursts are synchronized with the acknowledgment signals and the next buffer pointers. For this embodiment, the control memory supports back to back bursts.

The above described bus interface is designed to interface with a SBus, which is found on many SPARC® computer systems (SPARC is a registered trademark of SPARC International). Based on the above descriptions, it will be appreciated that the present invention may be practiced with other bus interfaces interfacing to other types of system bus.

Figure 21:
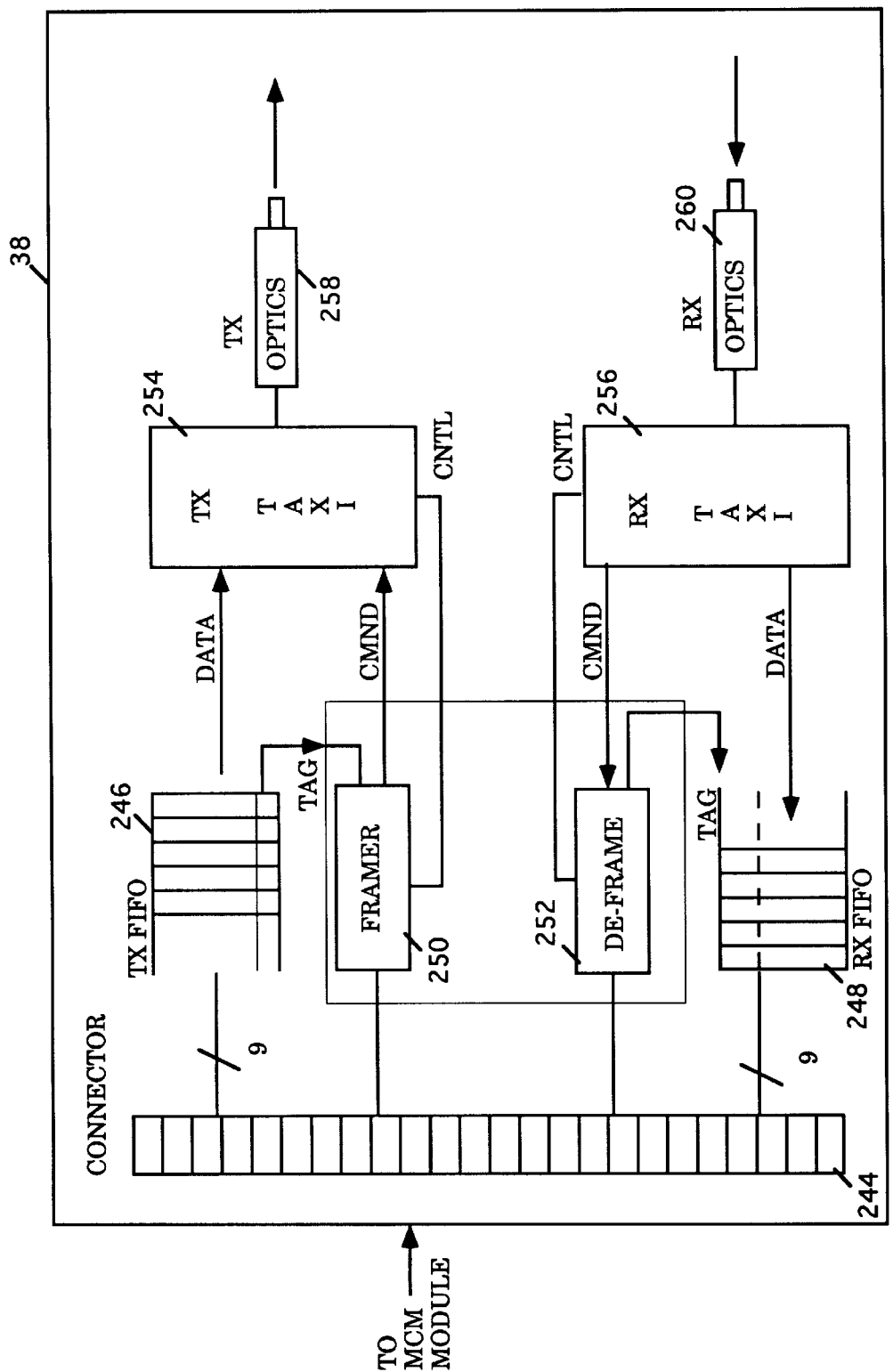
FIG. 21 illustrates one embodiment of the media interface.

Referring now to FIG. 21, a block diagram illustrating the media interface for the above described embodiment is shown. Shown are the key elements of the media interface 38, in particular, the connector for the MCM module 244, the transmit and receive FIFOs, 246 and 248, the framer and deframer, 250 and 252, the transmit and receive TAXI, 254 and 256, and the transmit and receive optical connectors, 258 and 260. The transmit FIFOs 246, the framer, the transmit TAXI 254 cooperate to transmit cells through the transmit optical connector 258. The receive FIFOs 248, the de-framer 252, and the receive TAXI 256, cooperate to receive cells through the receive optical connector 260.

The above described media interface 38 is designed to interface with an optical medium. Based on the above descriptions, it will be appreciated that the present invention may be practiced with the other media interfaces interfacing to other types of medium.

Figure 22:
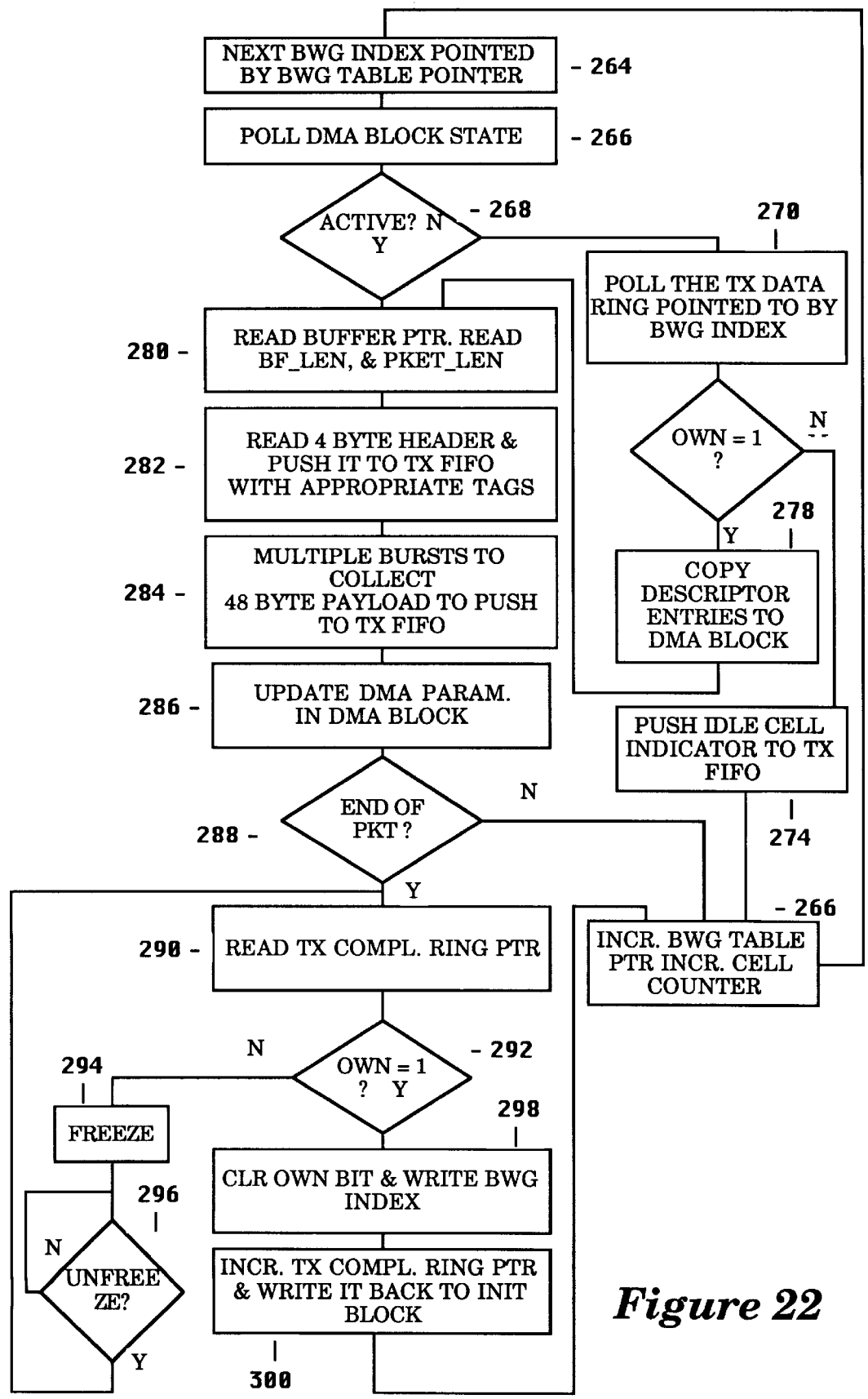
FIGS. 22–23 illustrate the transmit and the receive methods of the present invention.
Figure 23:
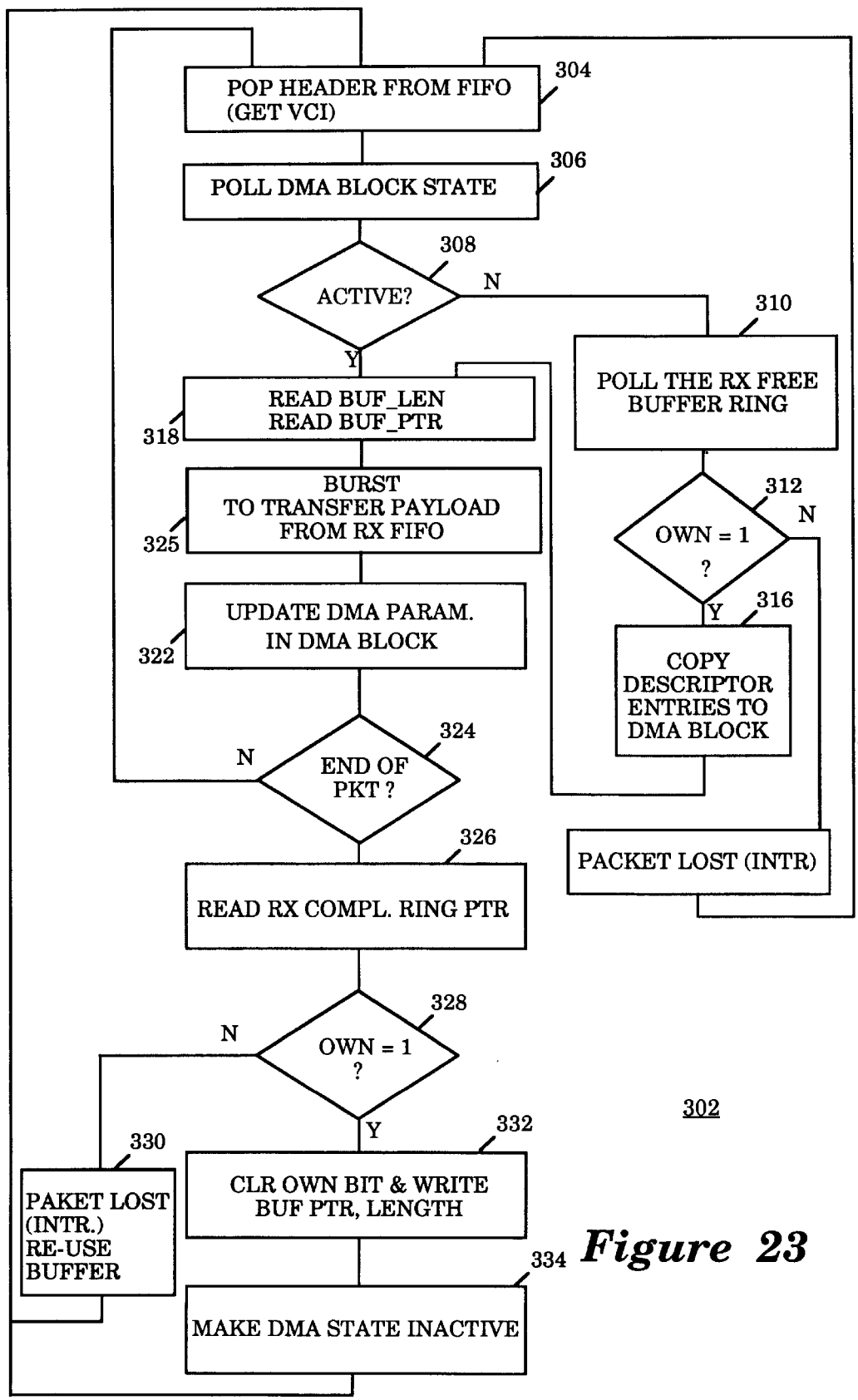

Referring now to FIGS. 22–23, two diagrams illustrating transmit and receive methods of the present invention are shown. As illustrated in FIG. 22, at each transmit cell time opportunity, the next BWG index in the BWG table is retrieved, block 264. The corresponding DMA state is then polled and determined if it is active, 266 and 268. If the corresponding TX DMA state is not active, the corresponding TX data ring is polled. If the corresponding TX DMA state is not owned by the network interface, the SAR module pushes the idle cells to the TX FIFOs, block 274. The BWG table pointer pointing to the next BWG, and the cell counter are incremented, block 276. If the corresponding TX DMA state is owned by the network interface, the transmit descriptor entries are copied into the corresponding DMA state, block 278.

Upon determining the TX DMA state is active or upon copying the descriptor entries into the TX DMA state, the transmit buffer pointer, the transmit buffer length and the packet length in the TX DMA state are read, block 280. Then, the cell header is read from the TX DMA state and pushes into TX FIFO with the appropriate tx_fifo_tag, block 282. Multiple bursts are made to collect the cell payload and pushes it into TX FIFOs with the appropriate tx_fifo_tags, block 284. The TX DMA parameters in the TX DMA state are updated.

Upon updating TX DMA state, TX_Sys determines whether end of packet has been reached. If end of packet has not been reached, the BWG table pointer pointing to the next BWG is updated, and the cell counter is incremented, block 276. The above steps are repeated. If end of packet has been reached, the TX completion ring pointer is read, block 290. TX_Sys determines if the network interface owns the corresponding completion ring descriptor, block 292. If the network interface does not own the corresponding completion ring descriptor, TX_Sys waits until the network interface becomes the owner, blocks 294 and 296, and repeats blocks 290 and 292. Upon determining that the network interface owns the corresponding completion ring descriptor, TX_Sys writes the BWG index into the corresponding completion ring descriptor and clears the ownership indicator, block 298. TX_Sys then increments the TX completion ring pointer in the transmit initialization block, writes it back to the transmit initialization block, block 300. Lastly, TX_Sys increments the BWG table pointer pointing to the next BWG index, and increments the cell counter, block 276.

As illustrated in FIG. 23, during each receive cell opportunity, a cell payload along with its cell header is popped from the RX FIFOs, and the VCI is extracted from the cell header, block 304. RX_sys then polls the corresponding DMA state, block 306. If the corresponding RX DMA state is not active, it polls one of the RX free buffer ring, block 310, and determines if it owns the polled RX free buffer ring, block 312. If RX_Sys does not own the polled RX free buffer ring, the packet is lost, block 314 If TX_Sys owns the polled RX free buffer ring, the descriptor information are copied into the corresponding RX DMA state in control memory.

Upon determining the corresponding RX DMA state as active or transferring the descriptor information into the corresponding RX DMA state, RX_Sys reads the buffer pointer, and buffer length in the corresponding RX DMA state, block 318. Then RX_Sys burst data onto the system bus through the bus interface, multiple bursts if necessary, to transfer the cell payload to the corresponding free buffer, block 320. RX_Sys then updates the DMA parameters in the corresponding RX DMA state, block 322.

Upon updating the DMA parameters, RX_Sys determines if end of packet has been reached, block 324. If end of packet has not been reached, the above steps are repeated. If end of packet has been reached, RX_Sys reads the corresponding RX completion ring pointer, block 326. Then, RX_Sys determines if the network interface owns the corresponding RX completion ring descriptor, block 328. If the network interface does not own the corresponding RX completion ring descriptor, the packet is lost, and the corresponding free buffer is reused, block 330. If the network interface owns the corresponding free buffer, RX_Sys writes the buffer pointer and length into the corresponding completion ring descriptor, and clears the ownership indicator, block 332. Lastly, RX_Sys inactivates the corresponding RX DMA state, block 334.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a network of computer systems comprising a plurality of computers and asynchronous transfer mode (ATM) switches, wherein said computers are coupled to each other through said ATM switches, an apparatus for a computer to asynchronously transfer data between itself and at least one other computer through at least one of said ATM switches, said apparatus comprising:

a) direct memory access (DMA) means coupled to said computer for storing a plurality of DMA state blocks for a plurality of memory-based virtual DMA channels for controlling and tracking a plurality of DMAs to memory means of said computer for asynchronously transferring a plurality of transmit packets from said computer to said ATM switches and a plurality of receive packets from said ATM switches to said computer;

b) Segmentation And Reassembly (SAR) means coupled to said memory means, and said DMA means for asynchronously cellifying said transmit packets into transmit cell payloads and reassembling receive cell payloads into said receive packets on said computer, said SAR means asynchronously causing said transmit and receive cell payloads to be transferred out of and onto said computer, said SAR means further maintaining said DMA state blocks for all the virtual DMA channels;

c) staging means coupled to said SAR means for asynchronously staging said transmit cell payloads for transmission and said receive cell payloads for reassembly, said SAR means asynchronously pushing said transmit cell payloads into said staging means and popping said receive cell payloads from said staging means;

d) media cell management (MCM) means coupled to said DMA means, SAR means, and said staging means for asynchronously transferring said transmit and receive cell payloads between said staging means and said ATM switches, said MCM means asynchronously popping said transmit cell payloads from said staging means and packing said transmit cell payloads before transmitting them to said ATM switches, and unpacking said receive cell payloads upon receiving them from said ATM switches before pushing them into said staging means, said MCM means further maintaining said DMA state blocks.

2. The apparatus as set forth in claim 1, wherein, said DMA means comprises:

a.1) control memory means for storing said plurality of DMA state blocks, said DMA state blocks comprising a plurality of transmit DMA state blocks and a plurality of receive DMA state blocks, each of said transmit DMA state blocks and receive DMA state blocks comprising control and state information of a transmit DMA or receive DMA state block, and descriptive information of a transmit/receive packet;

a.2) arbiter means coupled to said control memory means, said SAR means, said MCM means, and said computer for arbitrating accesses to said stored transmit DMA state blocks and receive DMA state blocks; and a.3) data bus means coupled to said control memory means, said SAR means, said MCM means, and said computer for transferring said control and state information of said transmit and receive DMAs, and said descriptive information of said transmit and receive packets between said control memory means and a selected one of said SAR means, said MCM means, and said computer.

3. The apparatus as set forth in claim 1, wherein said SAR means comprises:

b.1) transmit (TX_Sys) means coupled to said memory means, said DMA means, and said staging means for cellifying said transmit packets on said computer, said TX_Sys means, at every cell time opportunity, causing a transmit cell payload of a transmit packet to be bursted from said memory and staged in said staging means, said TX_Sys means further updating a corresponding DMA state block; and b.2) receive (RX_Sys) means coupled to said memory, said DMA means, and said staging means for reassembling said receive packets on said computer, said RX_Sys means, at every cell time opportunity, causing a staged receive cell payload to be bursted from said staging means and reassembled into a receive packet in said memory, said RX_Sys means further updating a corresponding DMA state blocks.

4. The apparatus as set forth in claim 1, wherein, said staging means comprises:

c.1) transmit staging (TX_FIFO) means coupled to said SAR means and said MCM means comprising a series of FIFOs for staging said transmit cell payloads for transmission, said transmit cell payloads being pushed into said TX_FIFO means by said SAR means, propagated through one FIFO, and popped from said TX_FIFO means by said MCM means, at a rate of one transmit cell payload per cell time opportunity; and c.2) receive staging (RX_FIFO) means coupled to said SAR means and said MCM means comprising a series of FIFOs for staging said receive cell payloads for reassembly, said receive cell payloads being pushed into said RX_FIFO means by said MCM means, propagated through one FIFO, and popped from said RX_FIFO means by said SAR means, at a rate of one receive cell payload per cell time opportunity.

5. The apparatus as set forth in claim 1, wherein said MCM means comprises:

d.1) transmit (TX_Med) means coupled to said DMA means, said SAR means, said staging means, and said ATM switches for packing and transmitting said staged transmit cell payloads to said ATM switches, said TX_Med means, at every cell time opportunity, causing a staged transmit cell payload to be popped from said staging means, packed, and transmitted to a selected one of said ATM switches, said TX_Med means further updating a corresponding DMA state block; and d.2) receive (RX_Med) means coupled to said DMA means, said staging means, and said ATM switches for receiving and unpacking said receive cell payloads from said ATM switches for staging, said RX_Med means causing a receive cell payload to be received as said receive cell payload arrives from a selected one of said ATM switches, unpacked, and pushed into said staging means, said RX_Med means further updating a corresponding DMA state block.

6. The apparatus as set forth in claim 1, wherein, said apparatus further comprises:

e) bandwidth mapping means coupled to said SAR means for mapping a bandwidth rate to a virtual DMA channel.

7. The apparatus as set forth in claim 1, wherein, said packing transmit cell payloads performed by said MCM means comprises generating cyclic redundancy check (CRC) values for their transmit packets, said MCM means generating said CRC values for said transmit packets incrementally by recalculating and maintaining partial CRC values as it packages said transmit cell payloads.

8. In a network of computer systems comprising a plurality of computers and asynchronous transfer mode (ATM) switches, wherein said computers are coupled to each other through said ATM switches, a method for a computer to asynchronously transfer data between itself and at least one other computer through at least one of said ATM switches, said method comprising the steps of:

a) storing a plurality of DMA state blocks for a plurality of memory-based virtual DMA channels for controlling and tracking a plurality of DMAs to memory means of said computer for asynchronously transferring a plurality of transmit packets from said computer to said ATM switches and a plurality of receive packets from said ATM switches to said computer;

b) asynchronously cellifying said transmit packets into transmit cell payloads and reassembling receive cell payloads into said receive packets on said computer, said transmit and receive cell payloads being asynchronously transferred out of and onto said computer, said DMA state blocks being maintained at the same time;

c) asynchronously staging said transmit cell payloads for transmission and said receive cell payloads for reassembly, said transmit and receive cell payloads being asynchronously pushed into and popped from their staging medium;

d) asynchronously transferring said transmit and receive cell payloads between their staging medium and said ATM switches, said transmit and receive cell payloads being asynchronously popped from and pushed into their staging medium, said transmit and receive cell payloads;

e) asynchronously packing and unpacking the cell payloads before transmitting to said ATM switches and before pushing into their staging medium upon receipt from said ATM switches, said DMA state blocks being maintained at the same time.

9. The method as set forth in claim 8, wherein, said step a) comprises the steps of:

a.1) storing said plurality of DMA state blocks, said DMA state blocks comprising a plurality of transmit DMA state blocks and a plurality of receive DMA state blocks, each of said transmit DMA state blocks and receive DMA state blocks comprising control and state information of a transmit or receive DMA, and descriptive information of a transmit or receive packet;

a.2) arbitrating accesses to said stored transmit and receive DMA state blocks for the performance of said steps b) and c); and a.3) transferring said control and state information of said transmit and receive DMAs, and said descriptive information of said transmit and receive packets from their storage for the performance of said steps b) and c).

10. The method as set forth in claim 8, wherein said step b) comprises the steps of:

b.1) cellifying said transmit packets on said computer, causing a transmit cell payload of a transmit packet to be bursted from said memory means and staged in its staging medium at every cell time opportunity, and updating a corresponding DMA state block; and b.2) reassembling said receive packets on said computer, causing a staged receive cell payload to be bursted from its staging medium and reassembled into a receive packet in said memory at every cell time opportunity, and updating a corresponding DMA state blocks.

11. The method as set forth in claim 8, wherein, said step c) comprises the steps of:

c.1) staging said transmit cell payloads in a first series of FIFOs for transmission, said transmit cell payloads being pushed into said first series of FIFOs, propagated through one FIFO, and popped from said first series of FIFOs, at a rate of one transmit cell payload per cell time opportunity; and c.2) staging said receive cell payloads in a second series of FIFOs for reassembly, said receive cell payloads being pushed into said second series of FIFOs, propagated through one FIFO, and popped from said second series of FIFOs, at a rate of one receive cell payload per cell time opportunity.

12. The method as set forth in claim 8, wherein said step d) comprises the steps of:

d.1) popping, packing, and transmitting a staged transmit cell payloads to a selected one of said ATM switches as said receive cell payload arrives, and updating a corresponding DMA state blocks at the same time; and d.2) receiving, unpacking, and pushing a receive cell payload from a selected one of said ATM switches as said receive cell payload arrives, and updating a corresponding DMA state block at the same time.

13. The method as set forth in claim 8, wherein, said step a) further comprises mapping bandwidth rates to said virtual DMA channels.

14. The method as set forth in claim 8, wherein, said packing the cell payloads in said step e) comprises generating cyclic redundancy check (CRC) values for their transmit packets, said CRC values being generated for said transmit packets incrementally by recalculating and maintaining partial CRC values as said transmit cell payloads are packed.

15. In a computer system comprising a central processing unit (CPU), a memory unit, and a plurality of input/output (I/O) devices, an apparatus for controlling direct accesses to said memory by said I/O devices, said apparatus comprising:

a) control memory means coupled to said memory unit and said I/O devices for storing a plurality of direct memory access (DMA) state blocks of DMAs of said I/O devices, said DMA state blocks comprising a plurality of read DMA state blocks and a plurality of write DMA state blocks, each of said read DMA state blocks and write DMA state blocks comprising control and state information of a read or write DMA, and descriptive information of a read or write packet of data;

b) arbiter means coupled to said control memory means, said CPU and said I/O devices for arbitrating accesses to said stored read DMA state blocks and write DMA state blocks; and c) data bus means coupled to said control memory means, said CPU and said I/O devices for transferring said control and state information of said read and write DMAs, and said descriptive information of said read and write packets of data between said control memory means and a selected one of said CPU and said I/O devices.

16. In a computer system comprising a central processing unit (CPU), a memory unit, and a plurality of input/output (I/O) devices, a method for controlling direct accesses to said memory by said I/O devices, said method comprising the steps of:

a) storing a plurality of direct memory access (DMA) state blocks of DMAs of said I/O devices, said DMA state blocks comprising a plurality of read DMA state blocks and a plurality of write DMA state blocks, each of said read DMA state blocks and write DMA state blocks comprising control and state information of a read/write DMA, and descriptive information of a read/write packet of data;

b) arbitrating accesses to said stored read and write DMA state blocks; and c) transferring said control and state information of said read and write DMAs, and said descriptive information of said read and write packets of data between said control memory means and a selected one of said CPU and said I/O devices.

17. In a network of computer system comprising a plurality of computers coupled to each other, an apparatus for cellifying and transmitting packets from a first to a second computer, said apparatus comprises:

a) direct memory access (DMA) means coupled to said first computer for storing a plurality of DMA state blocks for a plurality of memory-based virtual DMA channels for controlling and tracking a plurality of DMAs to memory means of said first computer for transferring a plurality of transmit packets from said first computer to said second computer;

b) Segmentation And Assembly (SA) means coupled to said memory means of said first computer, and said DMA means for cellifying said transmit packets into transmit cell payloads on said first computer, said SA means causing said transmit cell payloads to be transferred out of said first computer, said SA means further maintaining said DMA state blocks;

c) staging means coupled to said SA means for staging said transmit cell payloads for transmission, said SA means pushing said transmit cell payloads into said staging means;

d) media cell management (MCM) means coupled to said DMA means, SA means, and said staging means for transferring said transmit cell payloads between said staging means and said second computer, said MCM means popping said staged transmit cell payloads from said staging means and packing them before transmitting them to said second computer, said MCM means further maintaining said DMA state blocks.

18. The apparatus as set forth in claim 17, wherein said SA means comprises transmit (TX_Sys) means coupled to said memory means of said first computer, said DMA means, and said staging means for cellifying said transmit packets on said computer, said TX_Sys means, at every cell time opportunity, causing a transmit cell payload of a transmit packet to be bursted from said memory of said first computer and staged in said staging means, said TX_Sys means further updating a corresponding DMA state block.

19. In a network of computer system comprising a plurality of computers coupled to each other, a method for cellifying and transmitting packets from a first to a second computer, said method comprises the steps of:

a) storing a plurality of DMA state blocks for a plurality of memory-based virtual DMA channels for controlling and tracking a plurality of DMAs to memory means of said first computer for transferring a plurality of transmit packets from said first computer to said second computer;

b) cellifying said transmit packets into transmit cell payloads on said first computer, a segmentation and assembly (SA) means causing said transmit cell payloads to be transferred out of said first computer, said SA means further maintaining said DMA state blocks;

c) staging said transmit cell payloads for transmission, said SA means pushing said transmit cell payloads into a staging means for staging said transmit cell payloads;

d) transferring said transmit cell payloads between said staging means and said second computer, a media cell manager (MCM) means popping said staged transmit cell payloads from said staging means and packing them before transmitting them to said second computer, said MCM means further maintaining said DMA state blocks.

20. The method as set forth in claim 19, wherein said step b) comprises the step of cellifying said transmit packets on said computer, causing a transmit cell payload of a transmit packet to be bursted from said memory of said first computer and staged at every cell time opportunity, and updating a corresponding DMA state block.

21. In a network of computer systems comprising a plurality of computers coupled to each other, wherein transmit packets are transmitted between a first and a second computer through virtual DMA channels of said first computer, an apparatus for mapping a bandwidth rate to a virtual DMA channel of said first computer, said apparatus comprising:

a) control memory means for storing a bandwidth group table comprising a plurality of bandwidth group index entries pointing to a plurality of DMA state blocks of said virtual DMA channels, said DMA state blocks comprising pointers to transmit descriptor rings on a memory of said first computer having pre-assigned bandwidth rates, one of said bandwidth group index entries being retrieved from said bandwidth group table in a predetermined manner at every cell time opportunity by transmit means coupled to said first computer for transmitting said transmit packets;

b) arbiter means coupled to said transmit means and said first computer for arbitrating accesses to said bandwidth group table; and c) data bus means coupled to said transmit means and said computer for transferring said bandwidth group index entries between said control memory means and a selected one of said transmit means and said first computer.

22. In a network of computer systems comprising a plurality of computers coupled to each other, wherein transmit packets are transmitted between a first and a second computer through virtual DMA channels of said first computer, a method for mapping a bandwidth rate to a virtual DMA channel of said first computer, said method comprising the steps of:

a) storing a bandwidth group table comprising a plurality of bandwidth group index entries pointing to a plurality of DMA state blocks of said virtual DMA channels, said DMA state blocks comprising pointers to transmit descriptor rings on a memory of said first computer having pre-assigned bandwidth rates, one of said bandwidth group index entries being retrieved from said bandwidth group table in a predetermined manner at every cell time opportunity;

b) arbitrating accesses to said bandwidth group table for transmission of transmit packets; and c) transferring said bandwidth group index entries from their storage for transmission of transmit packets.

23. In a network of computer systems comprising a plurality of computers coupled to each other, wherein transmit packets are cellified for transmission between a first and a second computer, an apparatus for generating cyclic redundancy check (CRC) values for transmit packets, said apparatus comprises:

a) storage means for storing partial CRC values of said transmit packets; and b) computation and update means coupled to said storage means for retrieving said stored partial CRC values, re-computing new partial CRC values, and re-storing said re-computed partial CRC values, said computation and update means performing said retrievals, re-computations and updates responsive to cellified payloads of said transmit packets being packed for transmission.

24. In a network of computer systems comprising a plurality of computers coupled to each other, wherein transmit packets are cellified for transmission between a first and a second computer, a method for generating cyclic redundancy check (CRC) values for transmit packets, said method comprises the steps of:

a) storing partial CRC values of said transmit packets; and b) retrieving said stored partial CRC values, re-computing new partial CRC values, and re-storing re-computed partial CRC values, said retrievals, re-computations and updates being performed responsive to cellified payloads of said transmit packets being packed for transmission.

25. In a network of computer systems comprising a plurality of computers coupled to each other, wherein transmit packets are cellified for transmission and cell payloads of receive packets are received between a first computer and a second computer, an apparatus for tagging transmit and receive cell payloads, said apparatus comprising:

a) first generation means for generating transmit data tags for transmit cell payloads, said transmit data tags identifying said transmit cell payloads as valid transmit cell payloads, said transmit cell tags further identifying valid bytes within said transmit cell payloads;

b) second generation means for generating transmit control tags for pseudo transmit cell payloads, said transmit control tags identifying packing actions to be performed when packing said cell payloads for transmission, said packing actions comprising padding with cyclic redundancy check (CRC) value, padding without CRC value, generating an idle cell, and generating a packet header;

c) selection means coupled to said first and second generation means for selectively tagging said transmit data tags and said transmit control tags to said transmit cell payloads and said pseudo transmit cell payloads; and d) third generation means for generating receive tags for receive cell payloads, said receive tags being tagged to said receive cell payloads identifying them as valid receive cell payloads, said receive tags further identifying header entries of receive packets, last words of receive cell payloads, and last words of receive packets.

26. In a network of computer systems comprising a plurality of computers coupled to each other, wherein transmit packets are cellified for transmission and cell payloads of receive packets are received between a first computer and a second computer, a method for tagging transmit and receive cell payloads, said method comprising the steps of:

a) generating transmit data tags for transmit cell payloads, said transmit data tags identifying said transmit cell payloads as valid transmit cell payloads, said transmit cell tags further identifying valid bytes within said transmit cell payloads;

b) generating transmit control tags for pseudo transmit cell payloads, said transmit control tags identifying packing actions to be performed when packing said cell payloads for transmission, said packing actions comprising padding with cyclic redundancy check (CRC) value, padding without CRC value, generating an idle cell, and generating a packet header;

c) selectively tagging said transmit data tags and said transmit control tags to said transmit cell payloads and said pseudo transmit cell payloads; and d) generating receive tags for receive cell payloads, said receive tags being tagged to said receive cell payloads identifying them as valid receive cell payloads, said receive tags further identifying header entries of receive packets, last words of receive cell payloads, and last words of receive packets.

27. In a network of computer systems comprising a plurality of computers and asynchronous transfer mode (ATM) switches, wherein said computers are coupled to each other through said ATM switches, an apparatus for a computer to asynchronously transfer data between itself and at least one other computer through at least one of said ATM switches, said apparatus comprising:

a) direct memory access (DMA) means coupled to said computer for storing a plurality of DMA state blocks for a plurality of memory-based virtual DMA channels for controlling and tracking a plurality of DMAs to memory means of said computer for asynchronously transferring a plurality of transmit packets from said computer to said ATM switches and a plurality of receive packets from said ATM switches to said computer;

b) Segmentation And Reassembly (SAR) means coupled to said memory means, and said DMA means for asynchronously cellifying said transmit packets into transmit cell payloads and reassembling receive cell payloads into said receive packets on said computer, said SAR means asynchronously causing said transmit and receive cell payloads to be transferred out of and onto said computer, said SAR means further maintaining said DMA state blocks for all the virtual DMA channels;

c) staging means coupled to said SAR means for asynchronously staging said transmit cell payloads for transmission and said receive cell payloads for reassembly, said SAR means asynchronously pushing said transmit cell payloads into said staging means and popping said receive cell payloads from said staging means;

d) media cell management (MCM) means coupled to said DMA means, SAR means, and said staging means for asynchronously transferring said transmit and receive cell payloads between said staging means and said ATM switches, said MCM means asynchronously popping said transmit cell payloads from said staging means and packing said transmit cell payloads before transmitting them to said ATM switches, and unpacking said receive cell payloads upon receiving them from said ATM switches before pushing them into said staging means, said MCM means further maintaining said DMA state blocks; and e) bandwidth mapping means coupled to said SAR means for mapping a bandwidth rate to a virtual DMA channel, said bandwidth mapping means comprising:

e.1) control memory means for storing a bandwidth group table comprising a plurality of bandwidth group index entries pointing to said DMA state blocks of said virtual DMA channels, said DMA state blocks comprising pointers to transmit descriptor rings on said memory having pre-assigned bandwidth rates, said SAR means retrieving a bandwidth group index from said bandwidth group table in a predetermined manner at every cell time opportunity;

e.2) arbiter means coupled to said SAR means and said computer for arbitrating accesses to said bandwidth group table; and e.3) data bus means coupled to said SAR means and said computer for transferring said bandwidth group index entries between said control memory means and a selected one of said SAR means and said computer.

28. In a network of computer systems comprising a plurality of computers and asynchronous transfer mode (ATM) switches, wherein said computers are coupled to each other through said ATM switches, an apparatus for a computer to asynchronously transfer data between itself and at least one other computer through at least one of said ATM switches, said apparatus comprising:

a) direct memory access (DMA) means coupled to said computer for storing a plurality of DMA state blocks for a plurality of memory-based virtual DMA channels for controlling and tracking a plurality of DMAs to memory means of said computer for asynchronously transferring a plurality of transmit packets from said computer to said ATM switches and a plurality of receive packets from said ATM switches to said computer;

b) Segmentation And Reassembly (SAR) means coupled to said memory means, and said DMA means for asynchronously cellifying said transmit packets into transmit cell payloads and reassembling receive cell payloads into said receive packets on said computer, said SAR means asynchronously causing said transmit and receive cell payloads to be transferred out of and onto said computer, said SAR means further maintaining said DMA state blocks for all the virtual DMA channels;

c) staging means coupled to said SAR means for asynchronously staging said transmit cell payloads for transmission and said receive cell payloads for reassembly, said SAR means asynchronously pushing said transmit cell payloads into said staging means and popping said receive cell payloads from said staging means;

d) media cell management (MCM) means coupled to said DMA means, SAR means, and said staging means for asynchronously transferring said transmit and receive cell payloads between said staging means and said ATM switches, said MCM means asynchronously popping said transmit cell payloads from said staging means and packing said transmit cell payloads before transmitting them to said ATM switches, and unpacking said receive cell payloads upon receiving them from said ATM switches before pushing them into said staging means, said MCM means further maintaining said DMA state blocks, wherein said packing transmit cell payloads performed by said MCM means comprises generating cyclic redundancy check (CRC) values for their transmit packets, said MCM means generating said CRC values for said transmit packets incrementally by recalculating and maintaining partial CRC values as it packages said transmit cell payloads, said MCM means maintaining said partial CRC values for said transmit packets in corresponding DMA state blocks of said virtual DMA channels through which said transmit packets are being transferred to said ATM switches.

29. In a network of computer systems comprising a plurality of computers and asynchronous transfer mode (ATM) switches, wherein said computers are coupled to each other through said ATM switches, an apparatus for a computer to asynchronously transfer data between itself and at least one other computer through at least one of said ATM switches, said apparatus comprising:

a) direct memory access (DMA) means coupled to said computer for storing a plurality of DMA state blocks for a plurality of memory-based virtual DMA channels for controlling and tracking a plurality of DMAs to memory means of said computer for asynchronously transferring a plurality of transmit packets from said computer to said ATM switches and a plurality of receive packets from said ATM switches to said computer;

b) Segmentation And Reassembly (SAR) means coupled to said memory means, and said DMA means for asynchronously cellifying said transmit packets into transmit cell payloads and reassembling receive cell payloads into said receive packets on said computer, said SAR means asynchronously causing said transmit and receive cell payloads to be transferred out of and onto said computer, said SAR means further maintaining said DMA state blocks for all the virtual DMA channels, said SAR means pushing said transmit cell payloads into said staging means along with transmit cell tags identifying them as valid transmit cell payloads, said transmit cell tags further identifying valid bytes within said transmit cell payloads, said SAR means also selectively pushing arbitrary data into said staging means along with transmit cell tags that provide control information to said MCM means;

c) staging means coupled to said SAR means for asynchronously staging said transmit cell payloads for transmission and said receive cell payloads for reassembly, said SAR means asynchronously pushing said transmit cell payloads into said staging means and popping said receive cell payloads from said staging means;

d) media cell management (MCM) means coupled to said DMA means, SAR means, and said staging means for asynchronously transferring said transmit and receive cell payloads between said staging means and said ATM switches, said MCM means asynchronously popping said transmit cell payloads from said staging means and packing said transmit cell payloads before transmitting them to said ATM switches, and unpacking said receive cell payloads upon receiving them from said ATM switches before pushing them into said staging means, said MCM means further maintaining said DMA state blocks, said MCM means pushing said receive cell payloads into said staging means along with receive cell tags identifying them as valid receive cell payloads, said MCM means also pushing arbitrary data into said staging means along with receive cell tags that provide control information to said SAR means.

30. In a network of computer systems comprising a plurality of computers and asynchronous transfer mode (ATM) switches, wherein said computers are coupled to each other through said ATM switches, a method for a computer to asynchronously transfer data between itself and at least one other computer through at least one of said ATM switches, said method comprising the steps of:

a) storing a plurality of DMA state blocks for a plurality of memory-based virtual DMA channels for controlling and tracking a plurality of DMAs to memory means of said computer for asynchronously transferring a plurality of transmit packets from said computer to said ATM switches and a plurality of receive packets from said ATM switches to said computer;

b) mapping bandwidth rates to said virtual DMA channels including
   b.1) storing a bandwidth group table comprising a plurality of bandwidth group index entries pointing to said DMA state blocks of said virtual DMA channels, said DMA state blocks comprising pointers to transmit descriptor rings on said memory having pre-assigned bandwidth rates, one bandwidth group index being retrieved from said bandwidth group table in a predetermined manner at every cell time opportunity;
   b.2) arbitrating accesses to said bandwidth group table for the performance of one of a cellifying or a reassembling step; and
   b.3) transferring said bandwidth group index entries from their storage for the performance of the cellifying or the reassembling step.

c) asynchronously cellifying said transmit packets into transmit cell payloads and reassembling receive cell payloads into said receive packets on said computer, said transmit and receive cell payloads being asynchronously transferred out of and onto said computer, said DMA state blocks being maintained at the same time;

d) asynchronously staging said transmit cell payloads for transmission and said receive cell payloads for reassembly, said transmit and receive cell payloads being asynchronously pushed into and popped from their staging medium;

e) asynchronously transferring said transmit and receive cell payloads between their staging medium and said ATM switches, said transmit and receive cell payloads being asynchronously popped from and pushed into their staging medium, said transmit and receive cell payloads;

f) asynchronously packing and unpacking the cell before payloads transmitting to said ATM switches and before pushing into their staging medium upon receipt from said ATM switches, said DMA state blocks being maintained at the same time.

31. In a network of computer systems comprising a plurality of computers and asynchronous transfer mode (ATM) switches, wherein said computers are coupled to each other through said ATM switches, a method for a computer to asynchronously transfer data between itself and at least one other computer through at least one of said ATM switches, said method comprising the steps of:
  a) storing a plurality of DMA state blocks for a plurality of memory-based virtual DMA channels for controlling and tracking a plurality of DMAs to memory means of said computer for asynchronously transferring a plurality of transmit packets from said computer to said ATM switches and a plurality of receive packets from said ATM switches to said computer;
  b) asynchronously cellifying said transmit packets into transmit cell payloads and reassembling receive cell payloads into said receive packets on said computer, said transmit and receive cell payloads being asynchronously transferred out of and onto said computer, said DMA state blocks being maintained at the same time;
  c) asynchronously staging said transmit cell payloads for transmission and said receive cell payloads for reassembly, said transmit and receive cell payloads being asynchronously pushed into and popped from their staging medium;
  d) asynchronously transferring said transmit and receive cell payloads between their staging medium and said ATM switches, said transmit and receive cell payloads being asynchronously popped from and pushed into their staging medium, said transmit and receive cell payloads;
  e) asynchronously packing and unpacking the cell payloads before transmitting to said ATM switches and before pushing into their staging medium upon receipt from said ATM switches, said DMA state blocks being maintained at the same time, said packing including generating cyclic redundancy check (CRC) values for their transmit packets, said CRC values being generated for said transmit packets incrementally by recalculating and maintaining partial CRC values as said transmit cell payloads are packed, partial CRC values for said transmit packets being maintained in corresponding DMA state blocks of said virtual DMA channels through which said transmit packets are being transferred to said ATM switches.

32. In a network of computer systems comprising a plurality of computers and asynchronous transfer mode (ATM) switches, wherein said computers are coupled to each other through said ATM switches, a method for a computer to asynchronously transfer data between itself and at least one other computer through at least one of said ATM switches, said method comprising the steps of:
  a) storing a plurality of DMA state blocks for a plurality of memory-based virtual DMA channels for controlling and tracking a plurality of DMAs to memory means of said computer for asynchronously transferring a plurality of transmit packets from said computer to said ATM switches and a plurality of receive packets from said ATM switches to said computer;
  b) asynchronously cellifying said transmit packets into transmit cell payloads and reassembling receive cell payloads into said receive packets on said computer, said transmit and receive cell payloads being asynchronously transferred out of and onto said computer, said DMA state blocks being maintained at the same time;
  c) asynchronously staging said transmit cell payloads for transmission and said receive cell payloads for reassembly, said transmit and receive cell payloads being asynchronously pushed into and popped from their staging medium, said transmit cell payloads being pushed into staging along with transmit cell tags identifying them as valid transmit cell payloads, said transmit cell tags further identifying valid bytes within said transmit cell payloads; arbitrary data also being selectively pushed into staging along with transmit cell tags that provide control information for the performance of a step of asynchronously transferring; said receive cell payloads being pushed into staging along with receive cell tags identifying them as valid receive cell payloads; arbitrary data also being selectively pushed into staging along with receive cell tags that provide control information for the performance of said reassembling;
  d) asynchronously transferring said transmit and receive cell payloads between their staging medium and said ATM switches, said transmit and receive cell payloads being asynchronously popped from and pushed into their staging medium, said transmit and receive cell payloads;
  e) asynchronously packing and unpacking the cell before payloads transmitting to said ATM switches and before pushing into their staging medium upon receipt from said ATM switches, said DMA state blocks being maintained at the same time.

* * * * *